(12) United States Patent
Shibayama et al.

(10) Patent No.: US 10,175,107 B2
(45) Date of Patent: Jan. 8, 2019

(54) LIGHT-DETECTING DEVICE

(71) Applicant: HAMAMATSU PHOTONICS K.K., Hamamatsu-shi, Shizuoka (JP)

(72) Inventors: Katsumi Shibayama, Hamamatsu (JP); Takashi Kasahara, Hamamatsu (JP); Masaki Hirose, Hamamatsu (JP); Toshimitsu Kawai, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/031,780

(22) PCT Filed: Oct. 31, 2014

(86) PCT No.: PCT/JP2014/079103
§ 371 (c)(1),
(2) Date: Apr. 25, 2016

(87) PCT Pub. No.: WO2015/064749
PCT Pub. Date: May 7, 2015

(65) Prior Publication Data
US 2016/0245696 A1    Aug. 25, 2016

(30) Foreign Application Priority Data

Oct. 31, 2013    (JP) .................. 2013-227286

(51) Int. Cl.
*G01J 3/45* (2006.01)
*G01J 3/26* (2006.01)
(Continued)

(52) U.S. Cl.
CPC .............. *G01J 3/26* (2013.01); *G01J 3/0286* (2013.01); *G01J 3/45* (2013.01); *G01J 5/04* (2013.01); *G01J 5/20* (2013.01); *G02B 26/001* (2013.01)

(58) Field of Classification Search
CPC ... G01J 3/26; G01J 3/0286; G01J 3/45; G02B 5/28; G02B 5/284
(Continued)

(56) References Cited

U.S. PATENT DOCUMENTS

| | | | |
|---|---|---|---|
| 2003/0012230 A1* | 1/2003 | Hopkins | .................. H01S 5/141 372/20 |
| 2003/0132386 A1 | 7/2003 | Carr et al. | |
| 2003/0193983 A1* | 10/2003 | Cheng | .................. G02B 6/4246 372/92 |

(Continued)

FOREIGN PATENT DOCUMENTS

| | | |
|---|---|---|
| CN | 102449447 | 5/2012 |
| EP | 1 882 917 | 1/2008 |

(Continued)

OTHER PUBLICATIONS

International Preliminary Report on Patentability dated May 12, 2016 for PCT/JP2014/079103.
(Continued)

*Primary Examiner* — Tarifur R Chowdhury
*Assistant Examiner* — Jonathon Cook
(74) *Attorney, Agent, or Firm* — Drinker Biddle & Reath LLP

(57) ABSTRACT

A spectral sensor 1A includes a Fabry-Perot interference filter 10 which has a light transmission region 11; a light detector 3 which detects light having transmitted the light transmission region 11; spacers 4A and 4B which support the Fabry-Perot interference filter 10 in a surrounding region of the light transmission region 11; and a die bond resin 5 which adheres the Fabry-Perot interference filter 10 and the spacers 4A and 4B to each other. The die bond resin 5 has one opening A2 communicating with an inner side of the surrounding region and an outer side of the surrounding region, when viewed from a light transmission direction in the light transmission region 11.

14 Claims, 17 Drawing Sheets

(51) Int. Cl.
*G01J 3/02* (2006.01)
*G01J 5/04* (2006.01)
*G01J 5/20* (2006.01)
*G02B 26/00* (2006.01)

(58) Field of Classification Search
USPC .......................................... 356/454; 250/226
See application file for complete search history.

(56) References Cited

U.S. PATENT DOCUMENTS

| | | | | |
|---|---|---|---|---|
| 2003/0219056 | A1* | 11/2003 | Yager | G03F 7/70025 372/57 |
| 2003/0222218 | A1 | 12/2003 | Nozu | |
| 2005/0276306 | A1* | 12/2005 | Mick | G01K 11/26 374/117 |
| 2006/0055308 | A1* | 3/2006 | Lairson | G02B 5/284 313/489 |
| 2007/0099001 | A1* | 5/2007 | Melchior | G02B 1/115 428/446 |
| 2007/0230855 | A1* | 10/2007 | McDonald | G02B 5/284 385/5 |
| 2009/0040616 | A1* | 2/2009 | Lin | G01J 3/02 359/579 |
| 2010/0022840 | A1 | 1/2010 | Yasuda | |
| 2010/0296164 | A1* | 11/2010 | Yasuda | A61B 1/0008 359/579 |
| 2012/0068609 | A1* | 3/2012 | Ide | G02B 6/12004 315/152 |
| 2012/0109584 | A1 | 5/2012 | Urushidani | |
| 2013/0075596 | A1* | 3/2013 | Matsuno | G02B 26/001 250/226 |

FOREIGN PATENT DOCUMENTS

| | | |
|---|---|---|
| JP | H07-66982 B2 | 7/1995 |
| JP | H10-90576 A | 4/1998 |
| JP | H10-511772 A | 11/1998 |
| JP | 2001-235369 A | 8/2001 |
| JP | 2003-344156 A | 12/2003 |
| JP | 2005-106753 A | 4/2005 |
| JP | 2009-210312 A | 9/2009 |
| JP | 2011-117884 | 6/2011 |
| JP | 2012-127862 A | 7/2012 |
| JP | 2012-127917 A | 7/2012 |
| JP | 2012-173347 A | 9/2012 |

OTHER PUBLICATIONS

International Preliminary Report on Patentability dated May 12, 2016 for PCT/JP2014/079129.
Norbert Neumann et al., "Tunable infrared detector with integrated micromachined Fabry-Perot filter", Journal of Microlithography, Microfabrication and Microsys, Society of Photo-Optical Instrumentation Engineers, Bellingham, US, vol. 7, No. 2, ISSN: 1537-1646, DOI:10.1117/1.2909206, Apr. 1, 2008, p. 21004-1, XP007922298.
Norbert Neumann et al., "Fig. 10 of Tunable infrared detector with integrated micromachined Fabry-Perot Filter", J. Micro/Nanolith. MEMS MOEMS, Jun. 1, 2008, p. 21004-1, XP055394641.
Antila J, "Miniaturized spectrometer technologies", Information Optics(WI0), 2010 9th EURO-American Workshop on, IEEE, Piscataway, NJ, USA, ISBN:978-1-4244-8226-9, Jul. 12, 2010, p. 1-p. 4, XP031760871.

* cited by examiner (A)

(B)

(A)

(B)

(A)

(B)

(A)

(B)

(A)

(B)

(A)

(B)

(A)

(B)

(A)

(B)

(A)

(B)

(A)

(B)

LIGHT-DETECTING DEVICE

TECHNICAL FIELD

The present invention relates to a light-detecting device that includes a Fabry-Perot interference filter.

BACKGROUND ART

For example, a light-detecting device according to the related art is described in Patent Literature 1. In the light-detecting device, a Fabry-Perot interference filter is fixed on one surface of a support substrate having a through-hole by an adhesive portion. In addition, in the light-detecting device, a light reception element is disposed at a position corresponding to the through-hole, on the other surface of the support substrate. In the light-detecting device, the Fabry-Perot interference filter transmits only light of a specific wavelength. The light having transmitted the interference filter passes through the through-hole of the support substrate and is incident on the light reception element. The Fabry-Perot interference filter has a pair of mirrors facing each other with a gap therebetween. The wavelength of the light transmitted by the Fabry-Perot interference filter changes according to a distance between the pair of mirrors.

CITATION LIST

Patent Literature

Patent Literature 1: Japanese Patent Application Laid-Open Publication 2012-173347

SUMMARY OF INVENTION

Technical Problem

In the light-detecting device described above, the adhesive portion is provided to surround a light transmission region of the Fabry-Perot interference filter. In this configuration, when an ambient temperature of the light-detecting device changes, thermal strain occurs in the support substrate, for example, and the thermal strain is transmitted to the Fabry-Perot interference filter. Therefore, the distance between the pair of mirrors of the Fabry-Perot interference filter may change. In this case, a transmission wavelength of the Fabry-Perot interference filter changes. Therefore, a temperature characteristic of the transmission wavelength of the Fabry-Perot interference filter may be deteriorated.

Accordingly, an object of the present invention is to provide a light-detecting device that can suppress a temperature characteristic of a transmission wavelength of a Fabry-Perot interference filter from being deteriorated.

Solution to Problem

A light-detecting device according to an aspect of the present invention includes a Fabry-Perot interference filter which has a light transmission region; a light detector which detects light having transmitted the light transmission region; a support member which supports the Fabry-Perot interference filter in a surrounding region of the light transmission region; and an adhesive portion which adheres the Fabry-Perot interference filter and the support member to each other. The adhesive portion has an opening communicating with an inner side of the surrounding region and an outer side of the surrounding region, when viewed from a light transmission direction in the light transmission region.

In the light-detecting device, the adhesive portion to adhere the Fabry-Perot interference filter and the support member to each other has the opening communicating with the inner side of the surrounding region of the light transmission region and the outer side of the surrounding region, when viewed from the light transmission direction in the light transmission region. For this reason, in the opening, thermal strain from a peripheral member of the Fabry-Perot interference filter can be suppressed from being transmitted to the Fabry-Perot interference filter via the adhesive portion. Therefore, a temperature characteristic of the transmission wavelength of the Fabry-Perot interference filter can be suppressed from being deteriorated.

Here, the light-detecting device according to the aspect of the present invention may further include a wire connection portion to which one end of a wire electrically connected to the light detector or the Fabry-Perot interference filter is connected and which inputs or outputs an electric signal with respect to the light detector or the Fabry-Perot interference filter and a top surface of the wire connection portion may be disposed at a position lower than a position of a top surface of the Fabry-Perot interference filter. According to this configuration, connection of a wire from the Fabry-Perot interference filter or the light detector to a lead pin is easily performed.

In addition, the top surface of the wire connection portion may be disposed at a position lower than a position of a top surface of the support member. According to this configuration, connection of a wire from the Fabry-Perot interference filter or the light detector to the lead pin is easily performed.

In addition, the wire connection portion may include a first wire connection portion electrically connected to the light detector and a second wire connection portion electrically connected to the Fabry-Perot interference filter and a first direction in which a distance between the first wire connection portion and the Fabry-Perot interference filter becomes shortest may cross a second direction in which a distance between the second wire connection portion and the Fabry-Perot interference filter becomes shortest. According to this configuration, an arrangement of the wire can be prevented from being complicated and workability of wire bonding can be improved.

In addition, the adhesive portion may be provided at one side of the Fabry-Perot interference filter and one side adjacent thereto, when viewed from the transmission direction. According to this configuration, the Fabry-Perot interference filter can be stably disposed.

Here, the light-detecting device according to the aspect of the present invention may further include a wiring substrate and the light detector and the support member may be fixed on the wiring substrate. According to this configuration, the thermal strain from the peripheral member of the Fabry-Perot interference filter can be suppressed from being transmitted to the Fabry-Perot interference filter via the support member and the adhesive portion from the wiring substrate.

In addition, in the light-detecting device according to the aspect of the present invention, the support member may be fixed on the light detector. According to this configuration, the thermal strain from the peripheral member of the Fabry-Perot interference filter can be suppressed from being transmitted to the Fabry-Perot interference filter via the light detector and the adhesive portion from the wiring substrate.

In addition, in the light-detecting device according to the aspect of the present invention, the adhesive portion may be provided at only one side of the Fabry-Perot interference filter, when viewed from the transmission direction. According to this configuration, the thermal strain from a member disposed around the Fabry-Perot interference filter can be suppressed from being transmitted to the Fabry-Perot interference filter via the adhesive portion, at the side other than one side of the Fabry-Perot interference filter.

In addition, in the light-detecting device according to the aspect of the present invention, the support member may have an opening communicating with the inner side of the surrounding region and the outer side of the surrounding region, when viewed from the transmission direction. According to this configuration, the opening of the support member can be used to pass a bonding wire for electric connection of an element such as the light detector. For this reason, a bonding pad for electric connection of the element such as the light detector can be disposed at a position overlapping the Fabry-Perot interference filter, when viewed from the light transmission direction in the light transmission region. Therefore, the light-detecting device can be miniaturized.

In addition, in the light-detecting device according to the aspect of the present invention, the Fabry-Perot interference filter may have a bonding pad and the support member may be disposed at a position corresponding to the bonding pad, when viewed from the transmission direction. According to this configuration, in a wire bonding process at the time of manufacturing the light-detecting device, the bonding pad of the Fabry-Perot interference filter are supported by the support member provided at the position corresponding to the bonding pad. Therefore, wire bonding performance can be improved.

In addition, in the light-detecting device according to the aspect of the present invention, the support member may be separated from the light transmission region, when viewed from the transmission direction. According to this configuration, the support member and the light transmission region are separated from each other. Therefore, in manufacturing the light-detecting device, even when a material such as a resin used for the adhesive portion protrudes from the adhesive portion, the material such as the resin can be suppressed from entering the light transmission region.

Advantageous Effects of Invention

According to the present invention, a light-detecting device that can suppress a temperature characteristic of a transmission wavelength of a Fabry-Perot interference filter from being deteriorated can be provided.

DESCRIPTION OF EMBODIMENTS

Figure 1:
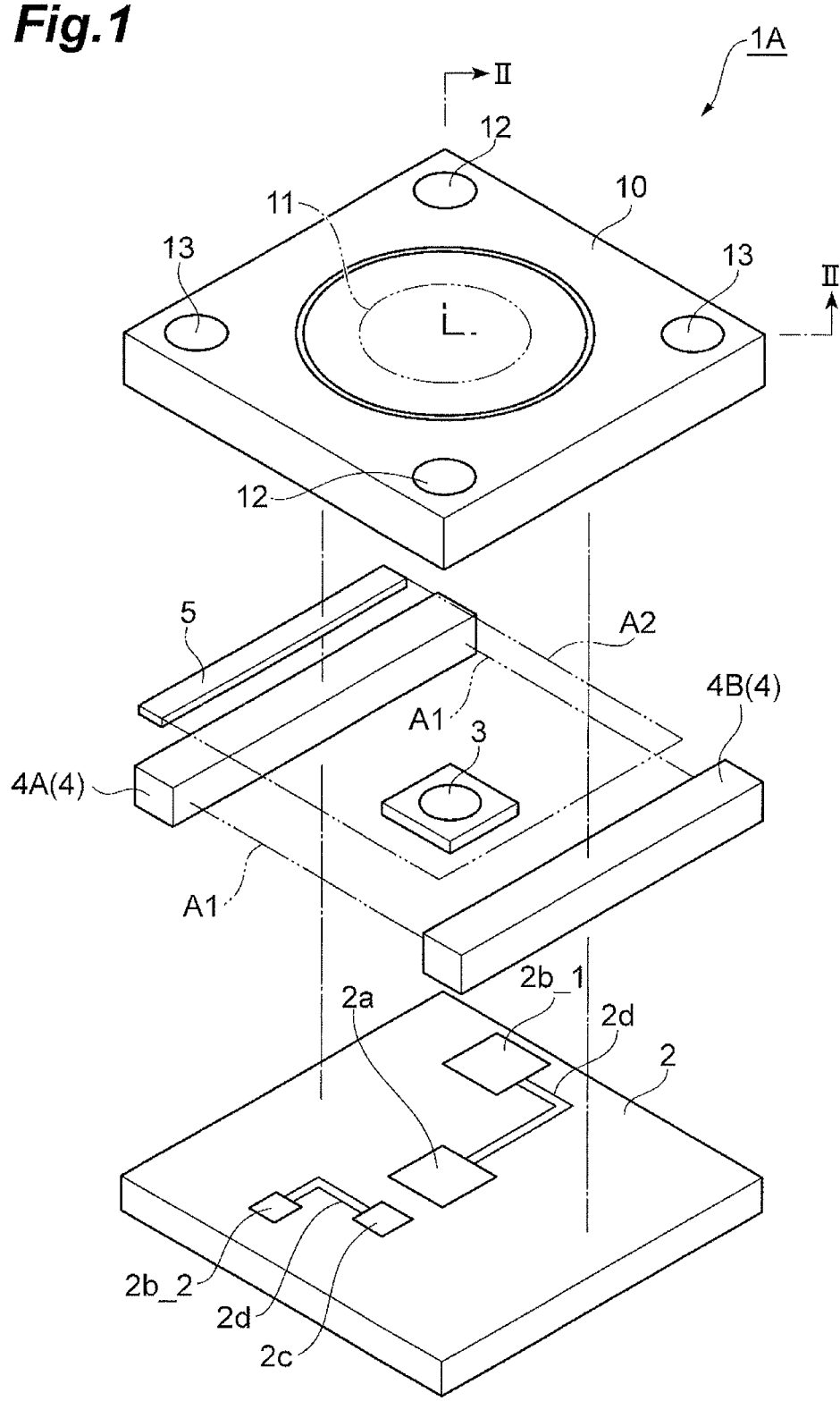
FIG. 1 is an exploded perspective view of a light-detecting device according to a first embodiment.

Hereinafter, preferred embodiments of the present invention will be described in detail with reference to the drawings. In the individual drawings, the same or equivalent portions are denoted with the same reference numerals and overlapped portions are omitted.

First Embodiment

[Spectral Sensor]

As illustrated in FIG. 1, a spectral sensor (light-detecting device) 1A includes a wiring substrate 2, a light detector 3, a plurality of spacers (support members) 4, a die bond resin 5, and a Fabry-Perot interference filter 10. A mounting unit 2*a*, a plurality of electrode pads 2*b*, and a mounting unit 2*c* are provided on the wiring substrate 2. The light detector 3 is mounted on the mounting unit 2*a*. A temperature compensation element such as a thermistor is mounted on the mounting unit 2*c*. An electrode pad 2*b*_1 is electrically connected to the mounting unit 2*a* by a wiring line 2*d*. An electrode pad 2*b*_2 (electrode pad 2*b*_2 not electrically connected to the mounting unit 2*a*) is electrically connected to the thermistor disposed on the wiring substrate 2 by the wiring line 2*d*. In addition, the electrode pad 2*b*_2 (electrode pad 2*b*_2 not electrically connected to the mounting unit 2*a*) electrically connects the thermistor to the outside of the spectral sensor 1A. The light detector 3 is an infrared detector, for example. As the infrared detector, a quantum-type sensor using InGaAs or a thermal sensor using a thermopile or a bolometer can be used. When each of an ultraviolet (UV) region, a visible region, and a near-infrared region is detected, a silicon photodiode can be used as the light detector 3. The spacers 4 and the Fabry-Perot interference filter 10 are adhered to each other by the die bond resin 5. In addition, portions in which the spacers 4 and the Fabry-Perot interference filter 10 are adhered to each other by the die bond resin 5 functioning as an adhesive agent form an adhesive portion.

The plurality of spacers 4 are fixed on the wiring substrate 2. The Fabry-Perot interference filter 10 is fixed on the plurality of spacers 4. In this way, the plurality of spacers 4 support the Fabry-Perot interference filter 10. At this time, to suppress an influence of thermal strain on the Fabry-Perot interference filter 10, the plurality of spacers 4 and the Fabry-Perot interference filter 10 are preferably fixed by the die bond resin 5. The die bond resin 5 is made of a flexible resin material. As examples of the resin material configuring the die bond resin 5, various resin materials such as silicone resins, urethane resins, epoxy resins, acrylic resins, and hybrid resins can be used. As the resin material of the die bond resin 5, a material of which elastic modulus (or Young's modulus) is equal to or smaller than 0.1 GPa is preferably used. In addition, the resin material is preferably selected from room temperature curing resin materials or low temperature curing resin materials.

Here, in the die bond resin 5 functioning as the adhesive agent to adhere the spacers 4 and the Fabry-Perot interference filter 10 to each other, hardness after hardening is smaller than hardness of an adhesive agent to adhere the spacers 4 and the wiring substrate 2 to each other. For example, the spacers 4 and the Fabry-Perot interference filter 10 are preferably fixed by an adhesive agent made of a silicon resin material of which elastic modulus after hardening is smaller than 10 MPa. In addition, the spacers 4 and the wiring substrate 2 are preferably fixed by an adhesive agent made of an epoxy resin material of which elastic modulus after hardening is equal to or larger than 100 MPa. As a result, the spacers 4 and the wiring substrate 2 can be fixed firmly and the thermal strain from a peripheral member of the Fabry-Perot interference filter 10 can be suppressed from being transmitted to the Fabry-Perot interference filter 10 via the adhesive agent.

In addition, silicon, ceramic, quartz, glass, and plastic can be used as examples of a material of the plurality of spacers 4. Particularly, to alleviate a difference of thermal expansion coefficients with portions contacting the plurality of spacers 4 in the Fabry-Perot interference filter 10, the material of the plurality of spacers 4 is preferably a material of which a thermal expansion coefficient is equal to or smaller than a thermal expansion coefficient of the material of the Fabry-Perot interference filter 10. For example, when the Fabry-Perot interference filter 10 is formed on a silicon substrate, the plurality of spacers 4 are preferably formed of a material having a small thermal expansion coefficient, such as the quartz and the silicon. In addition, instead of a configuration in which the wiring substrate 2 and the spacers 4 are formed separately as described above, a configuration in which portions becoming the spacers 4 are formed integrally on a surface of the wiring substrate 2 may be used.

The light detector 3 faces a light transmission region 11 of the Fabry-Perot interference filter 10 between the wiring substrate 2 and the Fabry-Perot interference filter 10. In addition, the light detector 3 detects light having transmitted the Fabry-Perot interference filter 10. In addition, a temperature sensor such as the thermistor may be disposed on the wiring substrate 2.

As described below, the wiring substrate 2, the light detector 3, the plurality of spacers 4, and the Fabry-Perot interference filter 10 are accommodated in a CAN package. In an accommodation state, the wiring substrate 2 is fixed on a stem and the light transmission region 11 of the Fabry-Perot interference filter 10 faces a light transmission window of a cap. The electrode pads 2b of the wiring substrate 2 are electrically connected to individual lead pins 84 penetrating the stem by wire bonding. In addition, terminals 12 and 13 of the Fabry-Perot interference filter 10 are electrically connected to the individual lead pins penetrating the stem by the wire bonding. An input/output of an electric signal with respect to the light detector 3 is executed via the lead pins, the electrode pads 2b, and the mounting unit 2a. A voltage is applied to the Fabry-Perot interference filter 10 via the lead pins and the terminals 12 and 13.

Figure 4:
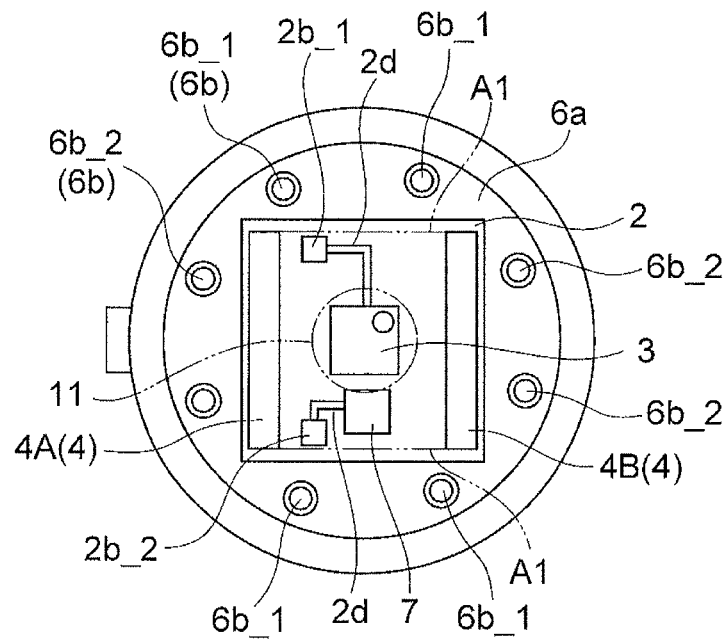
FIG. 4 is a plan view illustrating a process for manufacturing the light-detecting device according to the first embodiment, following FIG. 3.
Figure 4:
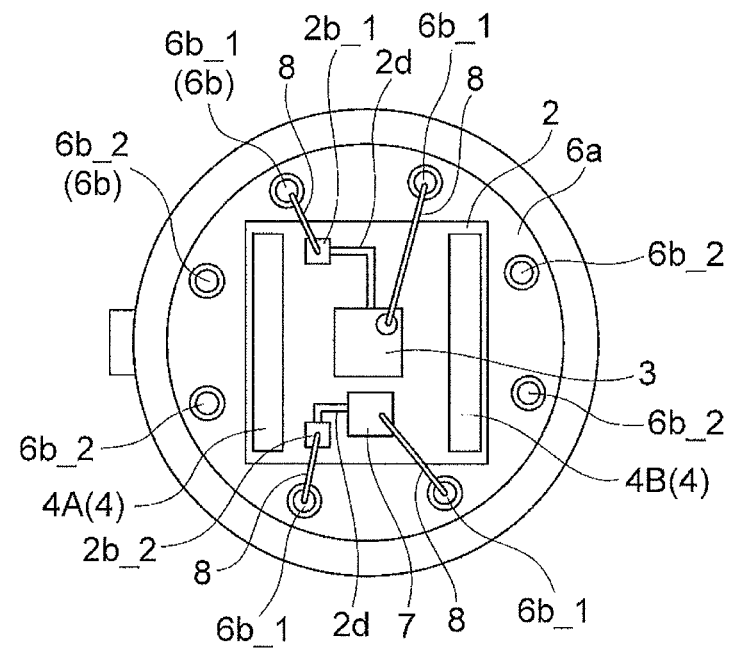

Hereinafter, an arrangement of the spacers 4 and the die bond resin 5 will be described. The spacers 4 are disposed to have an opening A1 communicating with an inner side and an outer side of a surrounding region (region that does not include the light transmission region 11 and surrounds the light transmission region 11) of the light transmission region 11, when viewed from a light transmission direction in the light transmission region 11 of the Fabry-Perot interference filter 10. In the present specification, if a certain element (for example, the spacers 4 or the die bond resin 5) has an opening, it means that the element has a break in at least one place. In other words, the element does not have an annular shape to surround a certain region (for example, the light transmission region 11) without a gap. A relation of lengths of the element and the opening is not limited in particular. For example, if the spacers 4 are provided in some portion on the circumference of a figure such as a circle and a polygon surrounding the light transmission region 11 and the spacers 4 are not provided in an entire portion, the spacers 4 have the openings A1. To dispose the Fabry-Perot interference filter 10 stably, the spacers 4 are preferably disposed on at least both sides of the light transmission region 11 when viewed from the light transmission direction. As a specific example of the spacers 4 having the opening, the two spacers 4 extending linearly may be disposed in parallel to each other (refer to FIG. 4(A)). As another specific example, the spacers 4 may be disposed in a shape of U (refer to FIG. 11(B)). As another specific example, the columnar spacers 4 may be disposed at four vertexes of a rectangle, respectively (refer to FIG. 12(A)).

In the spectral sensor 1A according to this embodiment, two linear spacers 4A and 4B disposed in parallel to each other are used as the spacers 4. The spacers 4A and 4B have the openings A1 shown by a two-dotted chain line between ends of the same sides in the spacers 4A and 4B. In other words, a rectangle to surround the light transmission region 11 is formed by the spacers 4A and 4B and the two openings A1 and A1. The spacers 4A and 4B are provided at two sides of the rectangle, respectively. In addition, the spacers 4A and 4B are not provided at the remaining two sides. The openings A1 and A1 are formed at the remaining two sides.

In addition, the die bond resin 5 is provided on only a top surface of the spacer 4A in the spacers 4A and 4B. In other words, the die bond resin 5 is not provided on a top surface of the spacer 4B. Therefore, a bottom surface of the Fabry-Perot interference filter 10 is adhered to the top surface of the spacer 4A by the die bond resin 5. However, the bottom surface of the Fabry-Perot interference filter 10 is not adhered to the top surface of the spacer 4B.

Similar to the spacers 4A and 4B, the die bond resin 5 has an opening communicating with the inner side and the outer side of the surrounding region. That is, the die bond resin 5 is disposed linearly over almost an entire length of the spacer 4A, on the top surface of the spacer 4A. A rectangle to surround the light transmission region 11 is formed by the die bond resin 5 and an opening A2 shown by a two-dotted chain line of a shape of U in FIG. 1. The die bond resin 5 is provided at one side of the rectangle. In addition, the die bond resin 5 is not provided at the remaining three sides. The opening A2 is formed at the remaining three sides.

In the spectral sensor 1A configured as described above, if measurement light is incident, light having a predetermined wavelength according to a voltage applied to the Fabry-Perot interference filter 10 transmits the Fabry-Perot interference filter 10. In addition, the light having transmitted the Fabry-Perot interference filter 10 is detected by the light detector 3. In the spectral sensor 1A, the light having transmitted the Fabry-Perot interference filter 10 is detected by the light detector 3 while the voltage applied to the Fabry-Perot interference filter 10 is changed, so that a spectral spectrum can be obtained.

[Fabry-Perot Interference Filter]

Figure 2:
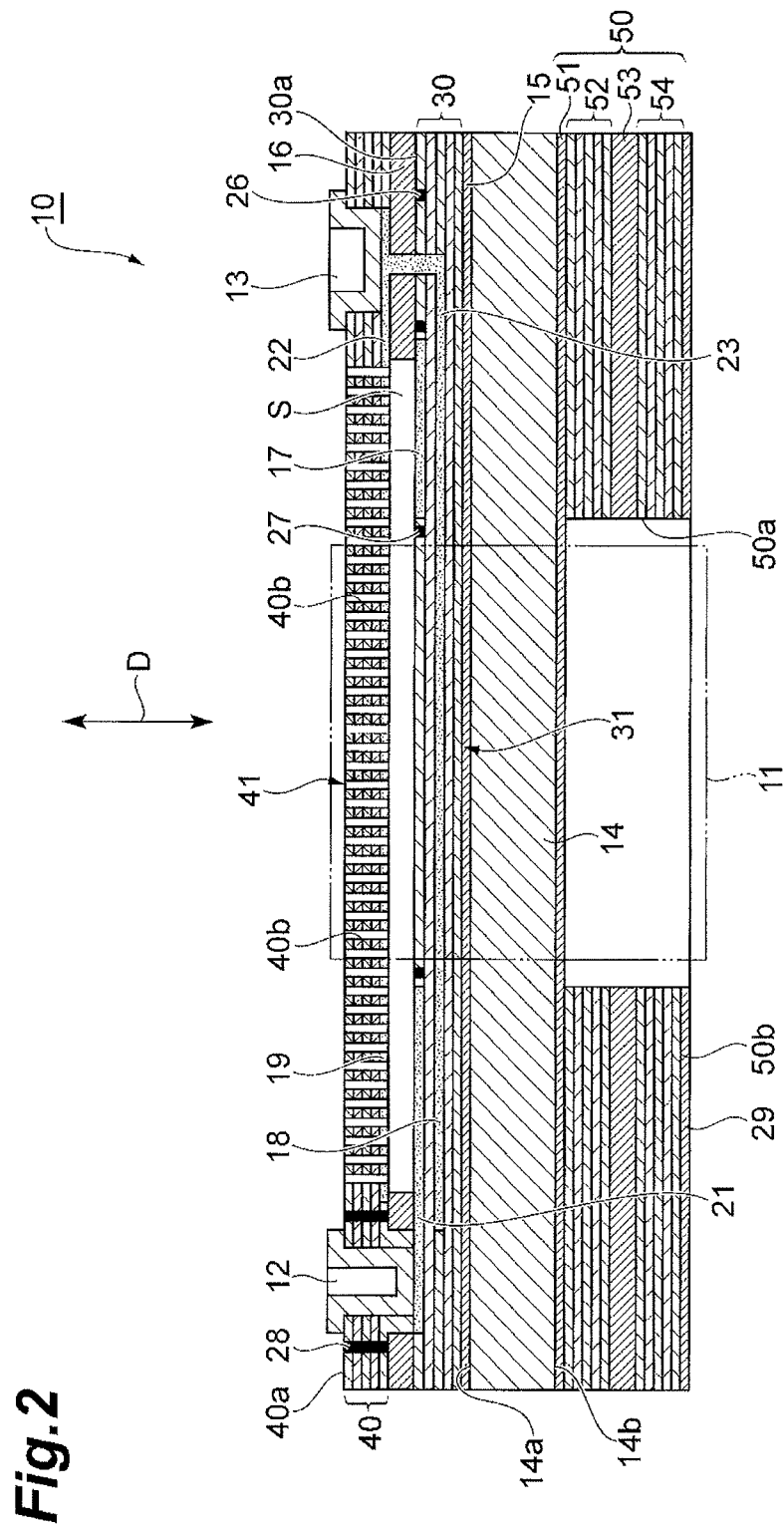
FIG. 2 is a cross-sectional view of a Fabry-Perot interference filter.

As illustrated in FIG. 2, the Fabry-Perot interference filter 10 includes a substrate 14. A reflection prevention layer 15, a first laminate 30, a sacrificial layer 16, and a second laminate 40 are sequentially stacked on a surface 14a of a light incidence side of the substrate 14. A gap (air gap) S is formed between the first laminate 30 and the second laminate 40 by the sacrificial layer 16 of a frame shape. In the Fabry-Perot interference filter 10, the measurement light is incident on the second laminate 40 from the side opposite to the substrate 14. In addition, the light having the predetermined wavelength transmits the light transmission region 11 defined in a center portion of the Fabry-Perot interference filter 10. In addition, the substrate 14 is made of silicon, quartz, and glass, for example. When the substrate 14 is made of the silicon, the reflection prevention layer 15 and the sacrificial layer 16 are made of silicon oxide, for example. A thickness of the sacrificial layer 16 is 200 nm to 10 μm. The thickness of the sacrificial layer 16 is preferably the integral multiple of ½ of a center transmission wavelength (that is, a wavelength to be a center of a variable range of a transmission wavelength of the Fabry-Perot interference filter 10).

A portion corresponding to the light transmission region 11 in the first laminate 30 functions as a first mirror 31. The first laminate 30 is configured by laminating a plurality of polysilicon layers and a plurality of silicon nitride layers alternately. An optical thickness of each of the polysilicon layer and the silicon nitride layer configuring the first mirror 31 is preferably the integral multiple of ¼ of the center transmission wavelength (center wavelength of the variable wavelength range).

A portion corresponding to the light transmission region 11 in the second laminate 40 functions as a second mirror 41 facing the first mirror 31 with the gap S therebetween. Similar to the first laminate 30, the second laminate 40 is configured by laminating a plurality of polysilicon layers and a plurality of silicon nitride layers alternately. An optical thickness of each of the polysilicon layer and the silicon nitride layer configuring the second mirror 41 is preferably the integral multiple of ¼ of the center transmission wavelength (center wavelength of the variable wavelength range).

In addition, a plurality of through-holes 40b are distributed uniformly in a portion corresponding to the gap S in the second laminate 40. The through-holes 40b extend from the surface 40a of the second laminate 40 to the gap S. The through-holes 40b are formed not to substantially affect a function of the second mirror 41. A diameter of the through-hole 40b is 100 nm to 5 μm, for example. In addition, an opening area of the through-holes 40b occupies 0.01% to 10% of an area of the second mirror 41.

In the Fabry-Perot interference filter 10, the first mirror 31 and the second mirror 41 are supported to the substrate 14.

In addition, the first mirror 31 is disposed on a light incidence side of the substrate 14. The second mirror 41 is disposed on a light incidence side of the first mirror 31 with the gap S therebetween.

In the first mirror 31, a first electrode 17 is formed to surround the light transmission region 11. The first electrode 17 is formed by doping impurities into the polysilicon layer and decreasing resistance.

In the first mirror 31, a second electrode 18 is formed to include the light transmission region 11. The second electrode 18 is formed by doping the impurities into the polysilicon layer and decreasing resistance. In the polysilicon layer, a size of the second electrode 18 is preferably a size including an entire region of the light transmission region 11. In addition, a size of the second electrode 18 may be almost equal to a size of the light transmission region 11.

In the second mirror 41, a third electrode 19 is formed. The third electrode 19 faces the first electrode 17 and the second electrode 18. The third electrode 19 is formed by doping the impurities into the polysilicon layer and decreasing resistance.

In the Fabry-Perot interference filter 10, the second electrode 18 is positioned at the side opposite to the third electrode 19 with respect to the first electrode 17, in a facing direction D in which the first mirror 31 and the second mirror 41 face each other. That is, the first electrode 17 and the second electrode 18 are not disposed on the same plane in the first mirror 31. The second electrode 18 is separated from the third electrode 19 more than the first electrode 17.

As illustrated in FIGS. 1 and 2, the terminals 12 apply a voltage to the Fabry-Perot interference filter 10. The pair of terminals 12 is provided to face each other with the light transmission region 11 therebetween. Each terminal 12 is disposed in the through-hole extending from the surface 40a of the second laminate 40 to the first laminate 30. Each terminal 12 is electrically connected to the first electrode 17 via a wiring line 21.

As illustrated in FIGS. 1 and 2, the terminals 13 apply a voltage to the Fabry-Perot interference filter 10. The pair of terminals 13 is provided to face each other with the light transmission region 11 therebetween. A facing direction of the pair of terminals 12 and a facing direction of the pair of terminals 13 are orthogonal to each other. Each terminal 13 is electrically connected to the third electrode 19 via a wiring line 22. In addition, the third electrode 19 is electrically connected to the second electrode 18 via a wiring line 23.

As illustrated in FIG. 2, trenches 26 and 27 are provided in a surface 30a of the first laminate 30. The trench 26 extends annularly to surround the wiring line 23 extending along the facing direction D from the terminal 13. The trench 26 electrically insulates the first electrode 17 and the wiring line 23 from each other. The trench 27 extends annularly along an inner edge of the first electrode 17. The trench 27 electrically insulates the first electrode 17 and an inner region of the first electrode 17 from each other. A region in each of the trenches 26 and 27 may be an insulating material and may be a gap.

A trench 28 is provided in the surface 40a of the second laminate 40. The trench 28 extends annularly to surround the terminal 12. A bottom surface of the trench 28 reaches the sacrificial layer 16. The trench 28 electrically insulates the terminal 12 and the third electrode 19 from each other. A region in the trench 28 may be an insulating material and may be a gap.

A reflection prevention layer 51, a third laminate 52, an intermediate layer 53, and a fourth laminate 54 are sequentially stacked on a surface 14b of a light emission side of the substrate 14. The reflection prevention layer 51 and the intermediate layer 53 have the same configurations as the configurations of the reflection prevention layer 15 and the sacrificial layer 16, respectively. The third laminate 52 and the fourth laminate 54 have lamination structures symmetrical to lamination structures of the first laminate 30 and the second laminate 40, on the basis of the substrate 14. A stress adjustment layer 50 is configured by the reflection prevention layer 51, the third laminate 52, the intermediate layer 53, and the fourth laminate 54. The stress adjustment layer 50 is disposed on the light emission side of the substrate 14 and has a function of suppressing a warp of the substrate 14. An opening 50a is provided in the stress adjustment layer 50 to include the light transmission region 11. A light shielding layer 29 is formed on a surface 50b of the light emission side of the stress adjustment layer 50. The light shielding layer 29 is made of aluminum and has a function of shielding measurement light.

In the Fabry-Perot interference filter 10 configured as described above, if a voltage is applied between the first electrode 17 and the third electrode 19 through the terminals 12 and 13, electrostatic force according to the voltage is generated between the first electrode 17 and the third electrode 19. By the electrostatic force, the second mirror 41 is driven to be attracted to the side of the first mirror 31 fixed on the substrate 14. By the drive, the distance between the first mirror 31 and the second mirror 41 is adjusted. The wavelength of the light transmitting the Fabry-Perot interference filter 10 depends on the distance between the first mirror 31 and the second mirror 41 in the light transmission region 11. Therefore, the wavelength of the transmitting light can be appropriately selected by adjusting the voltage applied between the first electrode 17 and the third electrode 19. At this time, the second electrode 18 has the same potential as the potential of the third electrode 19 electrically connected to the second electrode 18. Therefore, the second electrode 18 functions as a compensation electrode to maintain the first mirror 31 and the second mirror 41 in the light transmission region 11 evenly.

[Process for Manufacturing Spectral Sensor]

Figure 3:
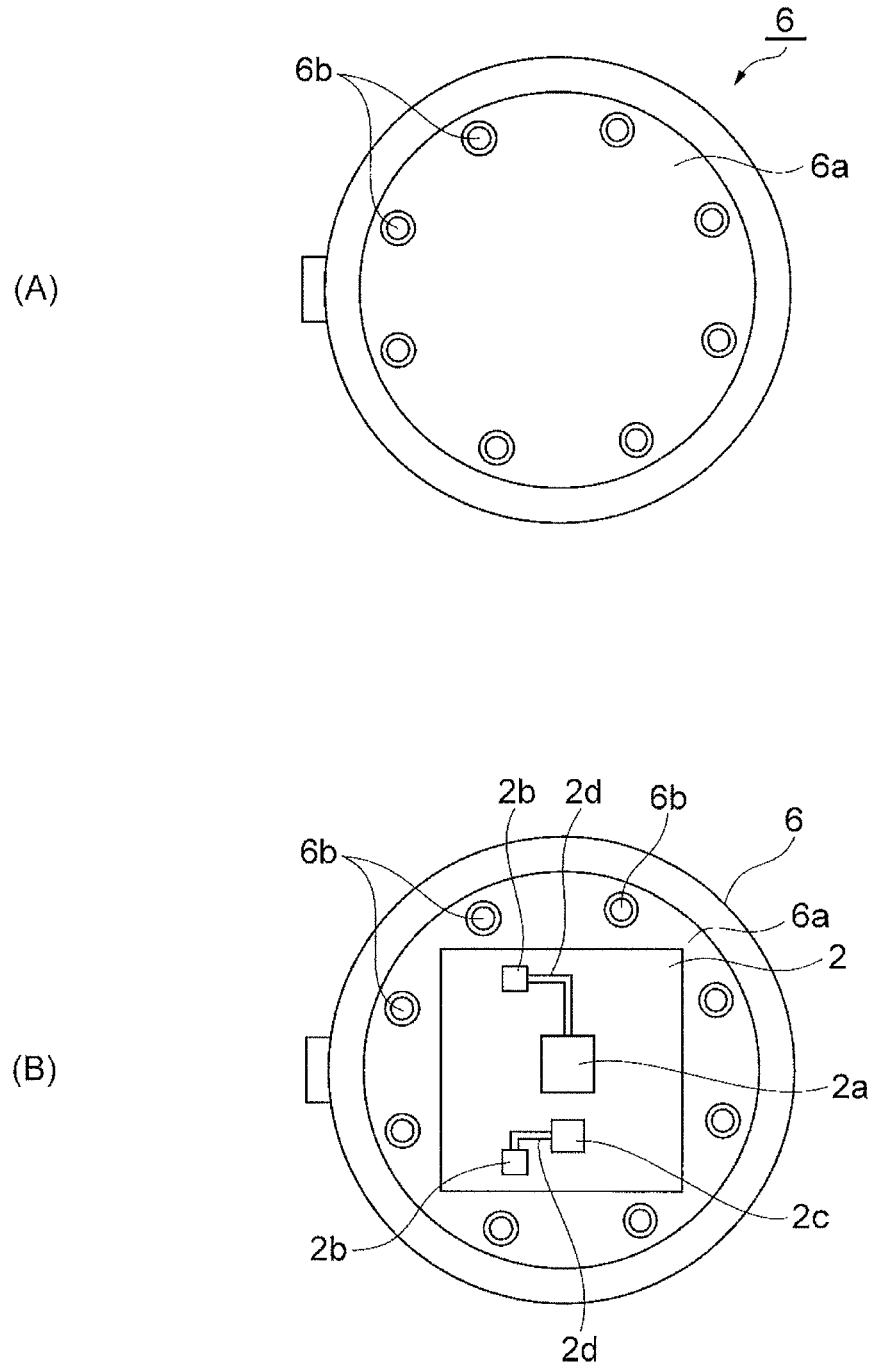
FIG. 3 is a plan view illustrating a process for manufacturing the light-detecting device according to the first embodiment.
Figure 6:
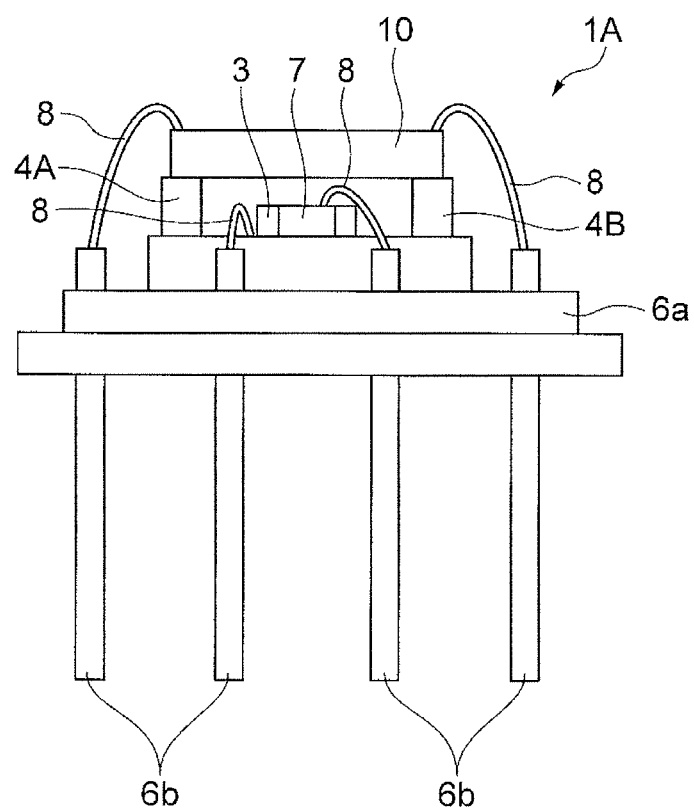
FIG. 6 is a lateral view corresponding to FIG. 5(B).
Figure 7:
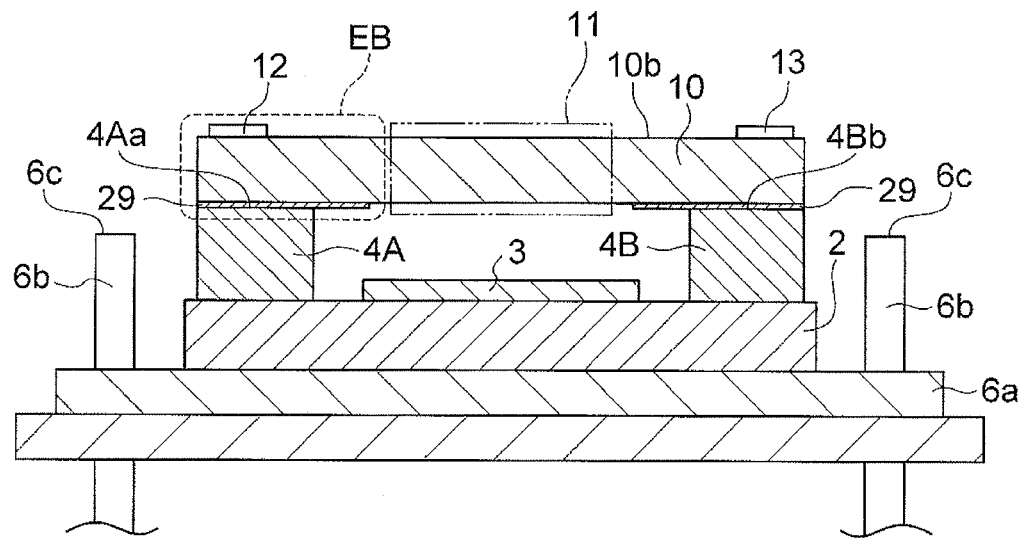
FIG. 7 is a cross-sectional view taken along line VII-VII of FIG. 5(B) and an enlarged view of a part thereof.
Figure 7:
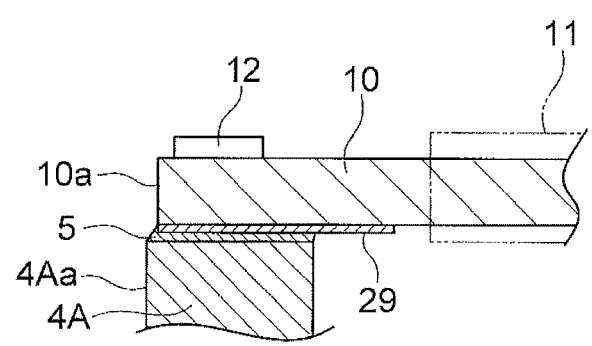

Next, processes for manufacturing the spectral sensor according to this embodiment will be described with reference to FIGS. 3 to 8. FIGS. 3 to 5 and 8 are plan views illustrating the manufacturing processes. FIG. 6 is a lateral view corresponding to FIG. 5(B). FIG. 7 is a cross-sectional view taken along line VII-VII of FIG. 5(B) and an enlarged view of a part thereof. As illustrated in FIG. 3(A), first, a stem 6 is prepared. The stem 6 is a TO-CAN stem, for example. The stem 6 has a configuration in which conductive lead pins 6b penetrate a disk-shaped base a.

Figure 17:
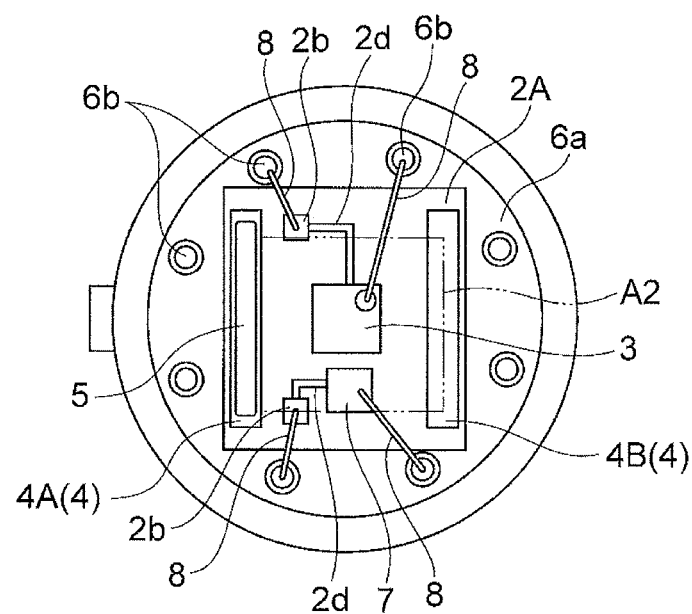
FIG. 17 is a plan view illustrating a modification of the light-detecting device according to the first embodiment.
Figure 17:
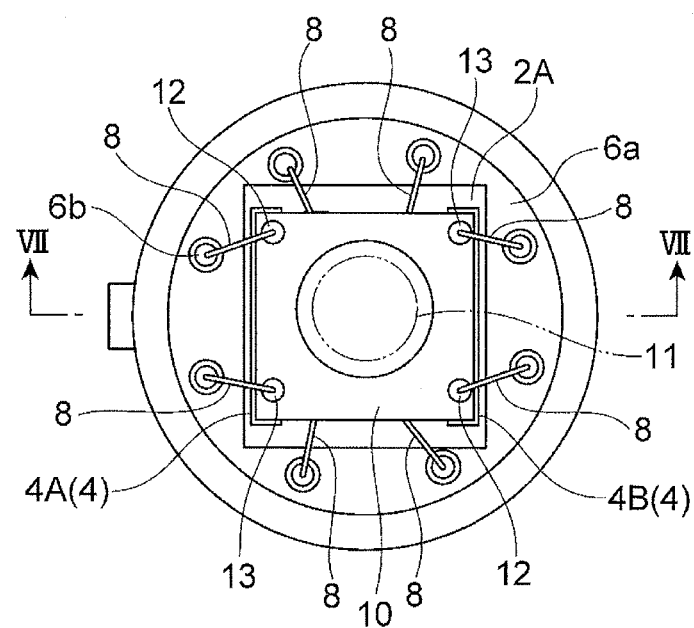

Next, as illustrated in FIG. 3(B), the wiring substrate 2 is disposed on the base 6a of the stem 6. In addition, the wiring substrate 2 is adhered to the base 6a by a resin. The mounting unit 2a, the plurality of electrode pads 2b, and the mounting unit 2c are disposed on the wiring substrate 2. The light detector 3 is fixed on the mounting unit 2a. A thermistor 7 is disposed on the mounting unit 2c. The mounting units 2a and 2c are electrically connected to the different electrode pads 2b by the wiring lines 2d. In FIG. 3(B), the wiring substrate 2 is described as having a plane shape of a square. However, the present invention is not limited thereto. For example, as illustrated in FIG. 17, the wiring substrate 2A may have a plane shape of a rectangle long in a direction in which a distance between the lead pin 6b connected to the light detector 3 and the Fabry-Perot interference filter 10 is shortest. According to this configuration, electric connection of the lead pin 6b and an element such as the light detector 3 disposed on a top surface of the wiring substrate 2 becomes easy.

Next, as illustrated in FIG. 4(A), the light detector 3 is disposed on the mounting unit 2a of the wiring substrate 2. In addition, the thermistor 7 is disposed on the mounting unit 2c of the wiring substrate 2. In addition, the spacers 4A and 4B to be two rod-shaped members are disposed on the wiring substrate 2 to extend in parallel to each other. As described above, the spacers 4 are provided to have the two openings A1 and A1, when viewed from a light transmission direction (direction perpendicular to a plane of paper) in the light transmission region 11 of the Fabry-Perot interference filter 10.

The two spacers 4A and 4B are disposed in a surrounding region of the light transmission region 11, when viewed from the light transmission direction in the light transmission region 11 of the Fabry-Perot interference filter 10. That is, the spacers 4A and 4B are disposed to be separated from the light transmission region 11, when viewed from the light transmission direction in the light transmission region 11. In addition, the thermistor 7 may be omitted.

Next, as illustrated in FIG. 4(B), the light detector 3, the thermistor 7, the electrode pads 2b_1 and 2b_2, and the lead pin 6b_1 (first wire connection portion) of the stem 6 are electrically connected by wire bonding using the wire 8. A material of the wire 8 is gold (Au), for example.

Next, as illustrated in FIG. 5(A), the die bond resin 5 is applied to one of the spacers 4. As described above, the die bond resin 5 is provided to have the opening A2, when viewed from the light transmission direction in the light transmission region 11. The die bond resin 5 is applied to be disposed on only one side of the Fabry-Perot interference filter 10, when viewed from the light transmission direction in the light transmission region 11 of the Fabry-Perot interference filter 10. One side of the Fabry-Perot interference filter 10 is the side of a region occupying about ¼ of the entire circumference of a center portion of the Fabry-Perot interference filter 10 in the case in which the Fabry-Perot interference filter 10 is divided radially from the center portion thereof, when viewed from the light transmission direction. One side of the Fabry-Perot interference filter 10 is one side of the Fabry-Perot interference filter 10 when the Fabry-Perot interference filter 10 has a rectangular shape. In the case of an example illustrated in FIG. 5(A), the die bond resin 5 is applied over almost an entire length of a top surface of the spacer 4A. In other words, the die bond resin 5 is not applied to a top surface of the spacer 4B.

Next, as illustrated in FIG. 5(B), the Fabry-Perot interference filter 10 is disposed on the spacers 4. As a result, the Fabry-Perot interference filter 10 is fixed on the spacers 4 by the die bond resin 5 (the Fabry-Perot interference filter 10 is disposed on the light detector 3 to be separated from each other). At this time, the spacers 4 are disposed at positions corresponding to the terminals 12 and 13. The terminals 12 and 13 function as bonding pads of the Fabry-Perot interference filter 10. In addition, the terminals 12 and 13 of the Fabry-Perot interference filter 10 are electrically connected to the lead pin 6b_2 (second wire connection portion) of the stem 6 by the wire 8. The material of the wire 8 is gold (Au), for example.

Here, a connection direction of the Fabry-Perot interference filter 10 and the lead pin 6b_2 (second direction in which a distance between the lead pin 6b_2 connected to the Fabry-Perot interference filter 10 and the Fabry-Perot interference filter 10 becomes shortest) and a connection direction of the light detector 3 and the lead pin 6b_1 (first direction in which a distance between the lead pin 6b_1 connected to the light detector 3 and the Fabry-Perot interference filter 10 becomes shortest) cross each other. According to this configuration, the arrangement of the wire 8 can be prevented from being complicated and workability of the wire bonding can be improved.

A lateral view corresponding to FIG. 5(B) is illustrated in FIG. 6. The Fabry-Perot interference filter 10 is adhered to one spacer 4A by the die bond resin 5. Meanwhile, the die bond resin 5 is not applied to the other spacer 4B. Therefore, the Fabry-Perot interference filter 10 is not adhered to the other spacer 4B.

Figure 5:
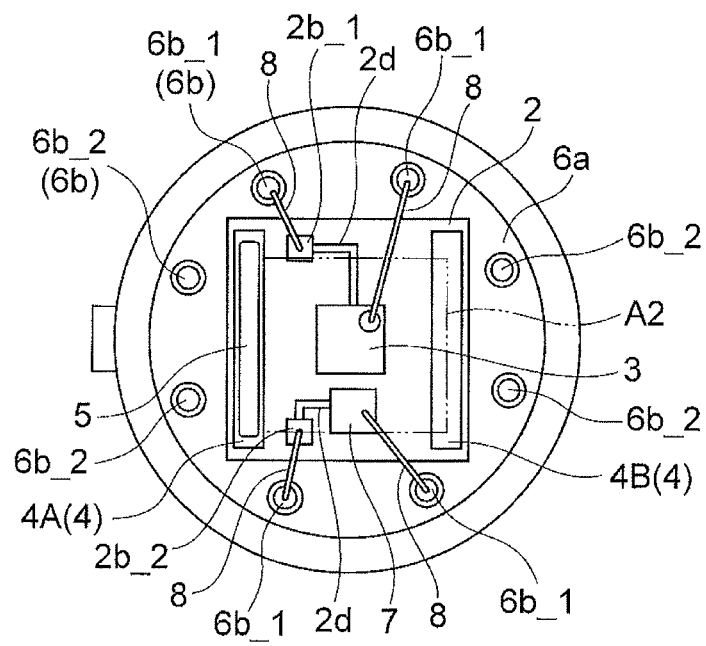
FIG. 5 is a plan view illustrating a process for manufacturing the light-detecting device according to the first embodiment, following FIG. 4.
Figure 5:
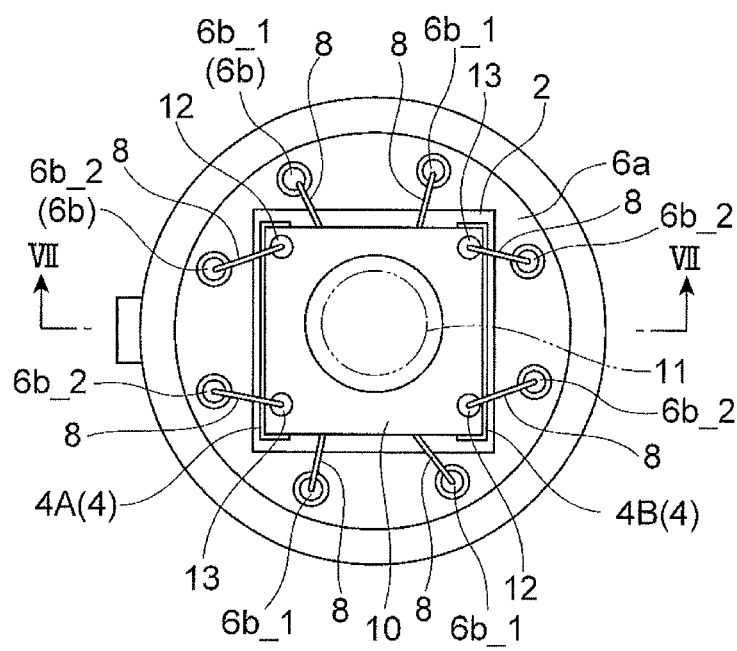

The cross-sectional view taken along line VII-VII of FIG. 5 is illustrated in FIG. 7(A). An enlarged view corresponding to a portion surrounded by an ellipse EB in FIG. 7(A) is illustrated in FIG. 7(B).

The spacers 4A and 4B are separated from the light transmission region 11 of the Fabry-Perot interference filter 10. In addition, the spacers 4A and 4B are disposed at the positions corresponding to the terminals 12 and 13 of the Fabry-Perot interference filter 10. Specifically, the spacers 4A and 4B are positioned right below the terminals 12 and 13. The Fabry-Perot interference filter 10 is adhered to the top surfaces of the spacers 4A and 4B, such that the top surfaces of the spacers 4A and 4B and the light shielding layer 29 of the Fabry-Perot interference filter 10 contact each other. In addition, as illustrated in FIG. 7(B), an outside surface 4Aa of the spacer 4A is positioned to be slightly closer to the outside than an outside surface 10a of the Fabry-Perot interference filter 10. In one embodiment, as illustrated in FIG. 7(A), a thickness of the wiring substrate 2 along the light transmission direction is 0.3 mm, a height of the spacer 4B is 0.4 mm, and a thickness of the Fabry-Perot interference filter 10 is 0.6 mm. In addition, a height of a portion where the lead pin 6b protrudes from a top surface of the base 6a is 0.5 mm. That is, a top surface 6c of the lead pin 6b is positioned lower than a top surface 10b of the Fabry-Perot interference filter 10. In addition, the top surface 6c of the lead pin 6b is positioned lower than top surfaces 4Ab and 4Bb of the spacers 4A and 4B. As a result, connection of the wire from the Fabry-Perot interference filter 10 or the light detector 3 to the lead pin 6b is easily performed.

Figure 8:
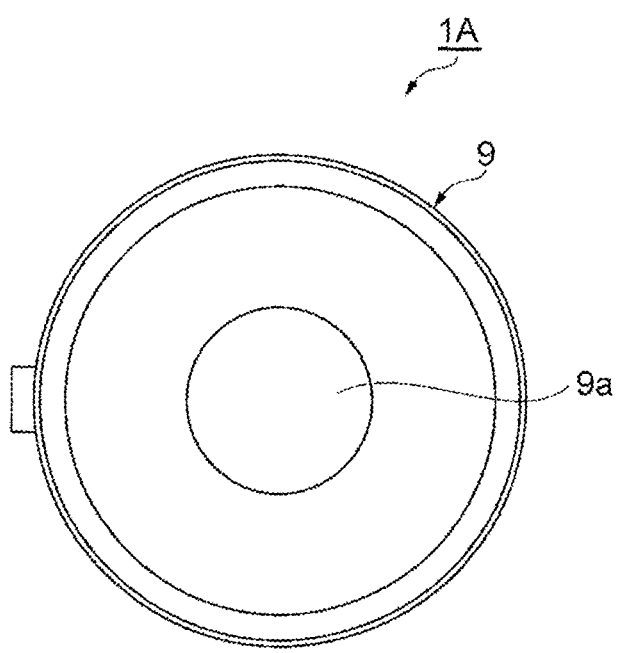
FIG. 8 is a plan view illustrating a process for manufacturing the light-detecting device according to the first embodiment, following FIG. 5.

A process following FIG. 5(B) is illustrated in FIG. 8. As illustrated in FIG. 8, a cap 9 made of a metal is mounted on the base 6a of the stem 6. By mounting the cap 9, the Fabry-Perot interference filter 10 and the light detector 3 are sealed. The cap 9 is formed to be approximately cylindrical and includes a circular transmission window 9a provided on a top surface thereof. The transmission window 9a may be a transmission window using a material corresponding to an application wavelength range of the spectral sensor 1A. As the material, glass, silicon, and germanium are exemplified. In addition, the transmission window 9a may be a window to which a reflection prevention film is attached or a bandpass filter to restrict the application wavelength range. The spectral sensor 1A is obtained by the manufacturing processes described with reference to FIGS. 3 to 8.

According to the spectral sensor 1A according to this embodiment, the die bond resin 5 to adhere the Fabry-Perot interference filter 10 and the spacer 4A to each other has the opening A2 communicating with the inner side and the outer side of a surrounding region of the light transmission region 11, when viewed from the light transmission direction in the light transmission region 11. For this reason, in the opening A2, the thermal strain from the peripheral member of the Fabry-Perot interference filter 10 such as the wiring substrate 2 can be suppressed from being transmitted to the Fabry-Perot interference filter 10 via the die bond resin 5. Therefore, a temperature characteristic of the transmission wavelength of the Fabry-Perot interference filter 10 can be suppressed from being deteriorated. In addition, the strain of the Fabry-Perot interference filter 10 caused by contraction in hardening of the die bond resin 5 when the Fabry-Perot interference filter 10 is adhered to the top surface of the spacer 4A can be reduced. In addition, an influence of the thermal strain of the peripheral member of the Fabry-Perot interference filter 10 when the die bond resin 5 is a thermosetting resin can be reduced. Therefore, a situation in which the strain occurs in the Fabry-Perot interference filter 10 and the transmission wavelength is shifted can be suppressed from occurring.

In addition, in the spectral sensor 1A, the die bond resin 5 has the opening A2 when viewed from the light transmission direction in the light transmission region 11. For this reason, a sealed space is not formed by the Fabry-Perot interference filter 10, the spacers 4A and 4B, and the die bond resin 5. Therefore, at the time of thermal hardening of the die bond resin 5 in manufacturing the spectral sensor 1A, a situation in which air in a space surrounded by the Fabry-Perot interference filter 10, the spacers 4A and 4B, and the die bond resin 5 thermally expands and breaks the die bond resin 5 does not occur. As a result, a situation in which misalignment of the Fabry-Perot interference filter 10 occurs and an optical characteristic is deteriorated can be suppressed from occurring. In addition, when an element having a membrane structure such as a thermopile is used as the light detector 3, the membrane structure of the light detector 3 can be prevented from being damaged by the thermal expansion of the air.

In addition, the spectral sensor 1A further includes the wiring substrate 2 and the light detector 3 and the spacers 4A and 4B are fixed on the wiring substrate 2. For this reason, the thermal strain from the peripheral member of the Fabry-Perot interference filter 10 can be suppressed from being transmitted to the Fabry-Perot interference filter 10 via the spacers 4A and 4B and the die bond resin 5 from the wiring substrate 2.

In addition, in the spectral sensor 1A, the adhesive portion is provided on only one side of the Fabry-Perot interference filter 10, when viewed from the light transmission direction in the light transmission region 11. For this reason, the thermal strain can be suppressed from being transmitted to the Fabry-Perot interference filter 10 via the adhesive portion from the member disposed around the Fabry-Perot interference filter 10, for example, the wiring substrate 2, at the side other than one side of the Fabry-Perot interference filter 10. In addition, the adhesive portion is provided on only one side of the Fabry-Perot interference filter 10. For this reason, the strain of the Fabry-Perot interference filter 10 caused by contraction at the time of hardening the die bond resin 5 can be further reduced. In addition, the influence of the thermal strain of the peripheral member of the Fabry-Perot interference filter 10 when the die bond resin 5 is the thermosetting resin can be further reduced. For this reason, the situation in which the strain occurs in the Fabry-Perot interference filter 10 and the transmission wavelength is shifted can be further suppressed from occurring.

In addition, in the spectral sensor 1A, the spacers 4A and 4B have the openings A1 communicating with the inner side and the outer side of the surrounding region of the light transmission region 11, when viewed from the light transmission direction in the light transmission region 11. For this reason, the openings A1 of the spacers 4A and 4B can be used to pass the wire 8 to electrically connect the elements such as the light detector 3. As a result, the electrode pad 2b to electrically connect the elements such as the light detector 3 can be disposed at the position overlapping the Fabry-Perot interference filter 10, when viewed from the light transmission direction in the light transmission region 11. Therefore, the spectral sensor 1A can be miniaturized.

In addition, the Fabry-Perot interference filter 10 has the terminals 12 and 13. The spacers 4A and 4B are disposed at the positions corresponding to the terminals 12 and 13, when viewed from the light transmission direction in the light transmission region 11. For this reason, in a wire bonding process at the time of manufacturing the spectral sensor 1A, the terminals 12 and 13 of the Fabry-Perot interference filter 10 are supported by the spacers 4A and 4B provided at the positions corresponding to the terminals 12 and 13. For this reason, stable wire bonding is enabled. Therefore, wire bonding performance can be improved.

In addition, the spacers 4A and 4B are separated from the light transmission region 11 of the Fabry-Perot interference filter 10, when viewed from the light transmission direction in the light transmission region 11. As a result, the spacer 4A and the light transmission region 11 are separated from each other. Therefore, in manufacturing the spectral sensor 1A, even when the die bond resin 5 protrudes from a portion between the spacer 4A and the Fabry-Perot interference filter 10, the die bond resin 5 can be suppressed from entering the light transmission region 11. Even when the die bond resin 5 is excessively applied, the surplus die bond resin 5 is moved to the lower side of the spacer 4A. Therefore, the die bond resin 5 can be prevented from being moved to the light transmission region 11.

In addition, as illustrated in FIG. 7(B), the outside surface of the spacer 4A is positioned to be slightly closer to the outside than the outside surface of the Fabry-Perot interference filter 10. As a result, a fillet of the die bond resin 5 is formed. Therefore, the adhesion is surely performed.

[Modification]

Figure 9:
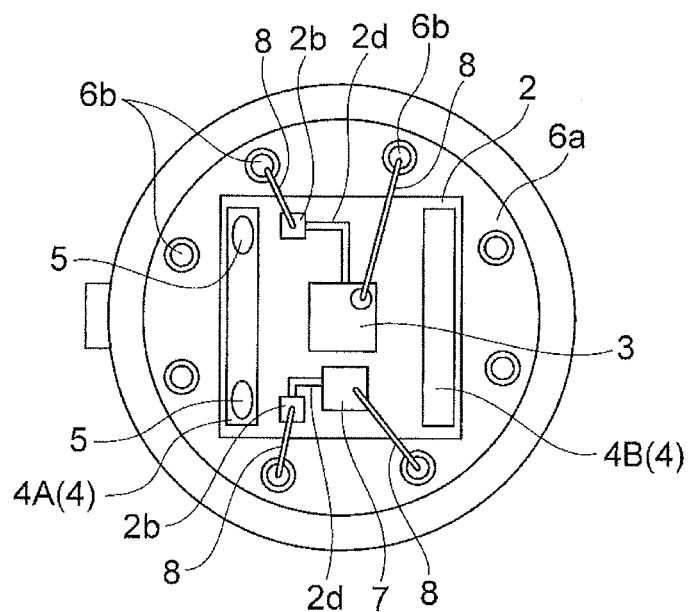
FIG. 9 is a plan view illustrating a modification of the light-detecting device according to the first embodiment.
Figure 9:
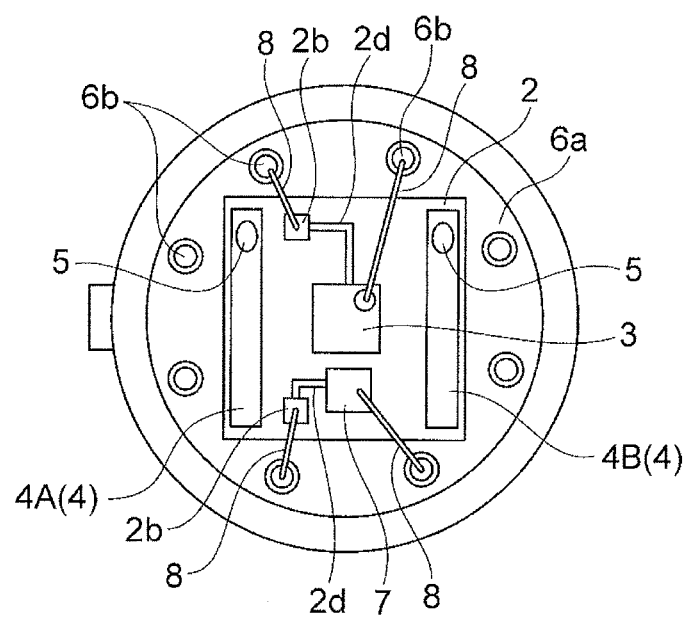

For the arrangement of the spacers 4 and the die bond resin 5 described with reference to FIG. 5(A), various modifications can be taken. For example, as illustrated in FIG. 9(A), the die bond resins 5 may be applied in a dotted shape. The die bond resins 5 are applied to both ends of the spacer 4A in the top surface of the spacer 4A. In addition, as illustrated in FIG. 9(B), the die bond resin 5 may be applied in a dotted shape. The die bond resins 5 are applied to ends positioned at the same sides of the spacers 4A and 4B. In this case, a portion between the die bond resins 5 of the dotted shape functions as an opening communicating with the inner side and the outer side of the surrounding region of the light transmission region.

Figure 10:
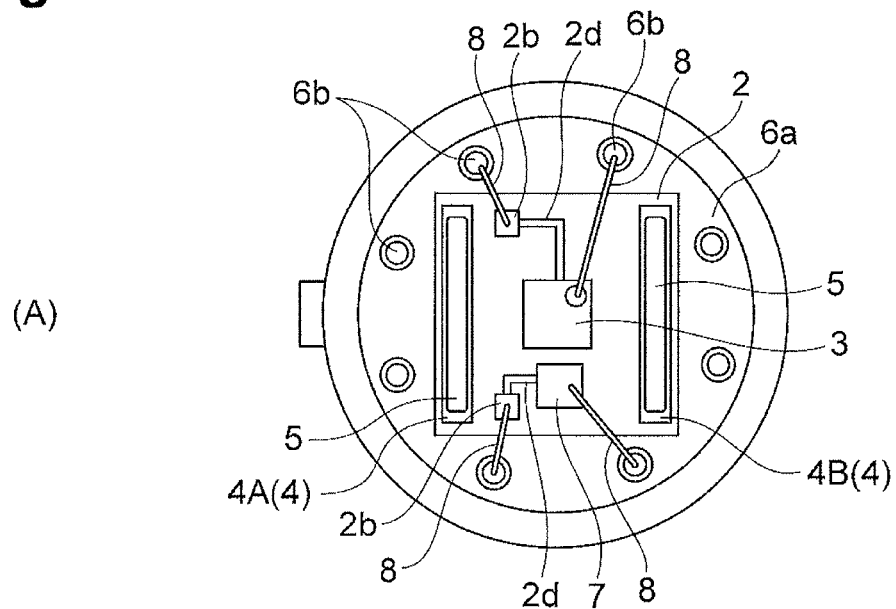
FIG. 10 is a plan view illustrating a modification of the light-detecting device according to the first embodiment.
Figure 10:
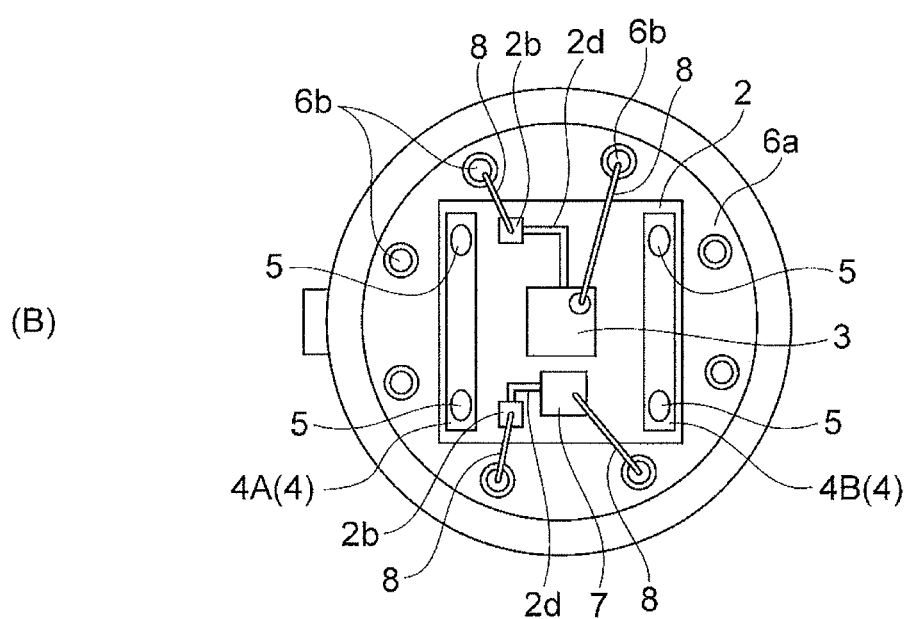
Figure 11:
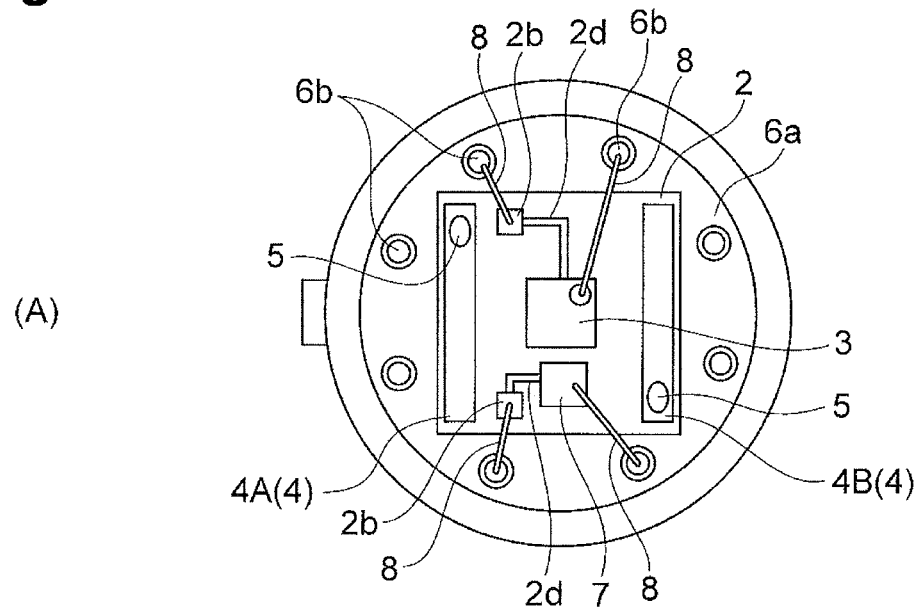
FIG. 11 is a plan view illustrating a modification of the light-detecting device according to the first embodiment.
Figure 11:
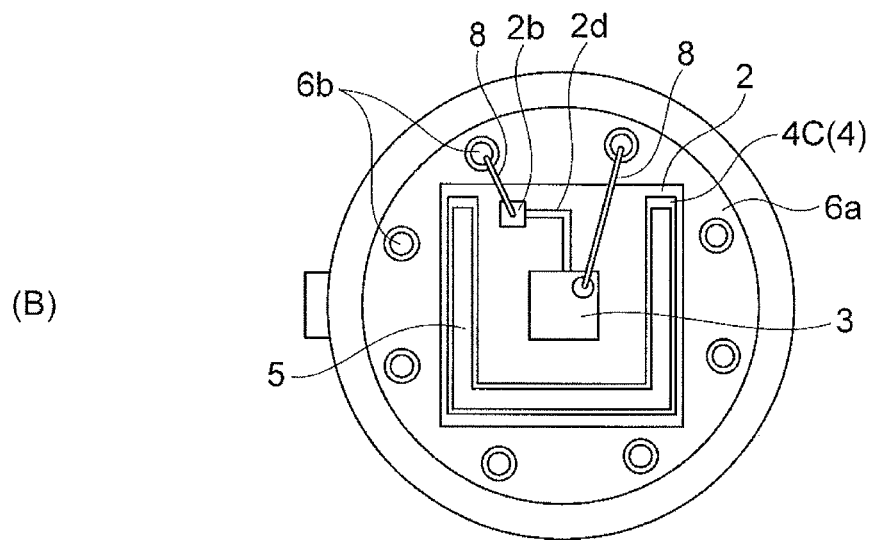

In addition, as illustrated in FIG. 10(A), the die bond resin 5 may be applied. The die bond resin 5 is applied over almost the entire length of the spacers 4A and 4B in the top surfaces of both the spacers 4A and 4B. As illustrated in FIG. 10(B), the die bond resins 5 may be applied. The die bond resins 5 are applied in a dotted shape to both ends of each of the spacers 4A and 4B. In addition, as illustrated in FIG. 11(A), the die bond resins 5 may be applied. The die bond resins 5 are applied to two ends positioned at different sides among the ends of the spacers 4A and 4B.

Figure 12:
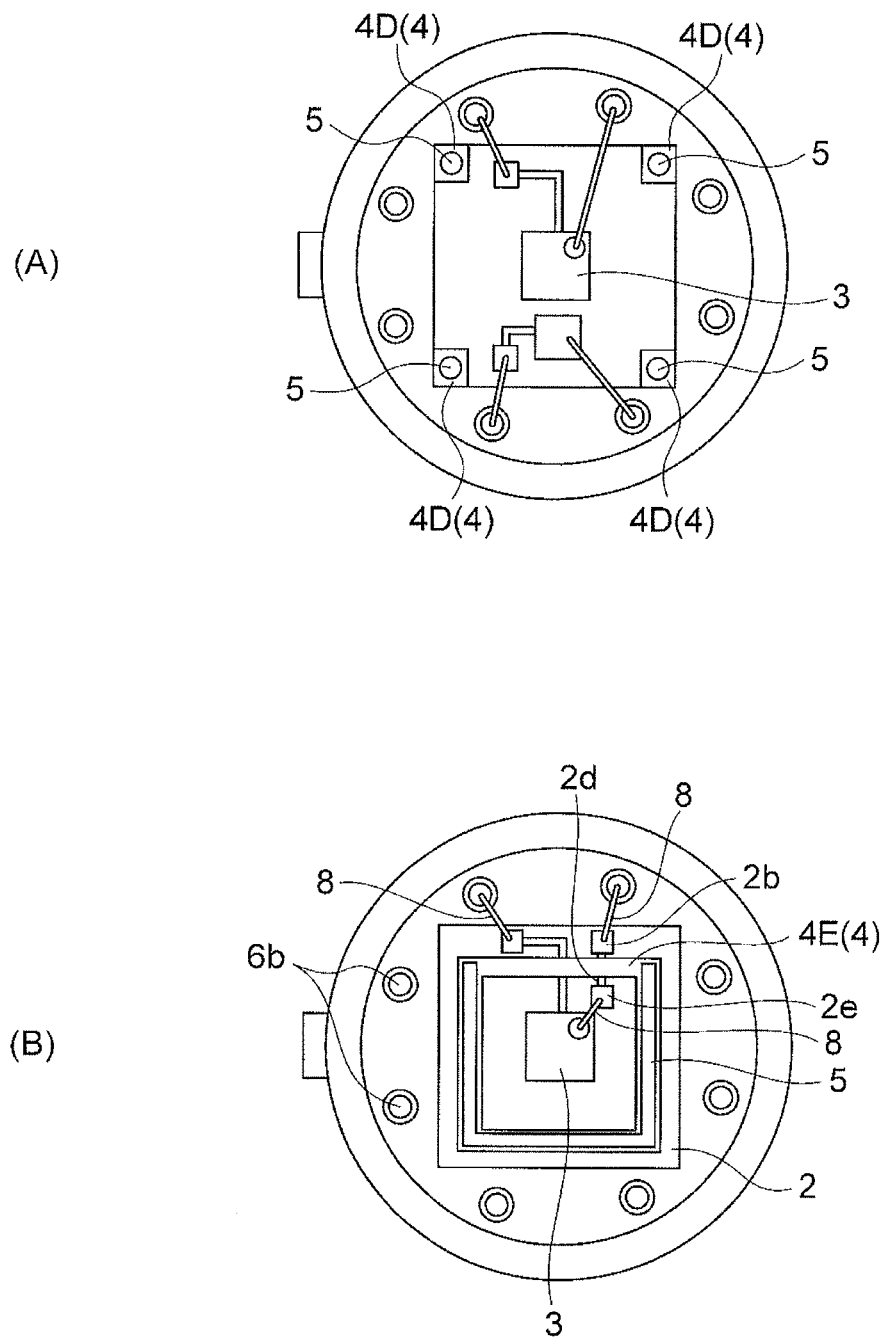
FIG. 12 is a plan view illustrating a modification of the light-detecting device according to the first embodiment.

In addition, the shape and the arrangement of the spacers 4 may be changed. For example, as illustrated in FIG. 11(B), a spacer 4C of a shape of U is fixed on the wiring substrate 2. In addition, the die bond resin 5 may be applied over almost the entire length of a top surface of the spacer 4C of the shape of U. The adhesive portion is formed at two sides (one side of the Fabry-Perot interference filter 10 and one side adjacent thereto) adjacent to each other, so that the Fabry-Perot interference filter 10 can be stably disposed. In addition, as illustrated in FIG. 12(A), columnar spacers 4D are fixed on four vertexes of the wiring substrate 2 of the rectangular shape, respectively. In addition, the die bond resins 5 may be applied in a dotted shape to top surfaces of the four spacers 4D.

In addition, the spacer 4 may not have the opening A1. That is, the spacer 4 may have an annular shape. For example, as illustrated in FIG. 12(B), a spacer 4E may be disposed on the wiring substrate 2. The spacer 4E has a rectangular shape and does not have an opening. Even in this case, the die bond resin 5 applied to a top surface of the spacer 4E may have an opening. That is, the adhesive portion may have an opening. The adhesive portion is formed by adhering the spacer 4 and the Fabry-Perot interference filter 10 by the die bond resin 5. In an example illustrated in FIG. 12(B), the die bond resin 5 is applied in a shape of U. In the case illustrated in FIG. 12(B), the light detector 3 is connected to an electrode pad 2e disposed in a region surrounded by the spacer 4 by the wire 8. The electrode pad 2e is connected to the electrode pad 2b by the wiring line 2d. Therefore, the light detector 3 is electrically connected to the electrode pad 2b. Here, the wiring line 2d between the electrode pads 2e and 2b is disposed between the top surface of the wiring substrate 2 and the spacer 4. Here, an insulating layer is formed on the top surface of the wiring substrate 2. The insulating layer protects the wiring line 2d, such that the wiring line 2d does not directly contact the spacer 4. In FIGS. 11(B) and 12(B), the thermistor 7, the wire 8 connected to the thermistor 7, and the wiring line 2d are omitted.

In addition, a part of the die bond resin 5 applied to the bottom surface of the Fabry-Perot interference filter 10 may not contribute to adhering the spacer 4 and the Fabry-Perot interference filter 10 to each other. For example, in contrast to the case illustrated in FIG. 12(B), a configuration in which the spacer 4 has an opening and the die bond resin 5 does not have an opening may be used. For example, even though the die bond resin 5 is applied annularly to a peripheral portion of the light transmission region 11 in the bottom surface of the Fabry-Perot interference filter 10, the spacer 4 may have an opening. That is, there may be a portion in which the spacers 4 and the Fabry-Perot interference filter 10 are not adhered to a part of the circumference of a figure such as a circle and a polygon surrounding the light transmission region by the die bond resin 5.

Second Embodiment

Next, a light-detecting device according to a second embodiment will be described. A spectral sensor 1B according to the second embodiment is different from the spectral sensor 1A according to the first embodiment in a shape of a package. That is, the spectral sensor 1B is different from the spectral sensor 1A using the stem 6 in that a package thereof is a surface mount device (SMD) package for surface mounting.

Figure 13:
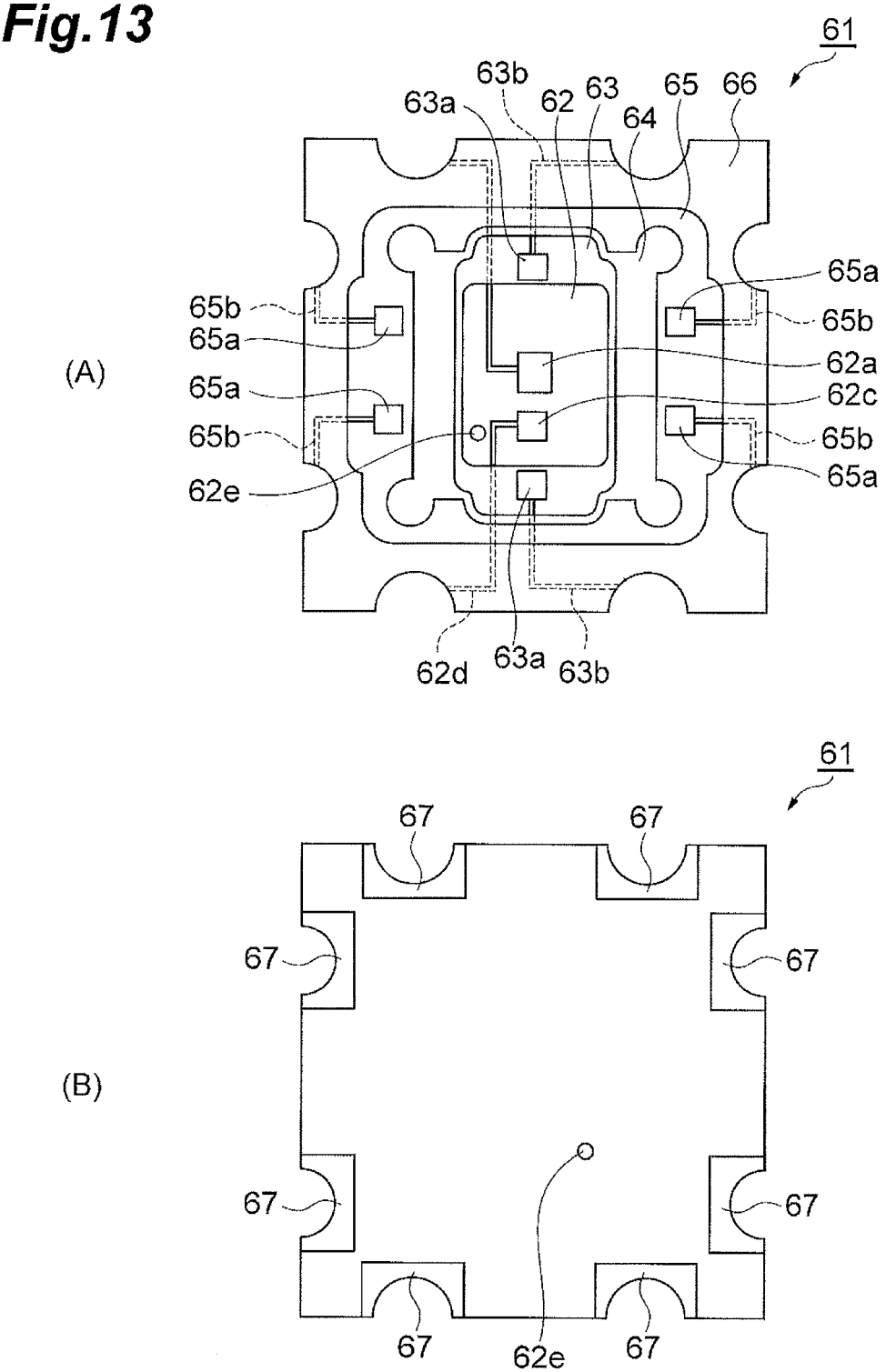
FIG. 13 is a plan view illustrating a process for manufacturing a light-detecting device according to a second embodiment.

Hereinafter, processes for manufacturing the spectral sensor 1B will be described. First, an SMD package 61 illustrated in FIG. 13 is prepared. FIG. 13(A) is a plan view of the SMD package 61 and FIG. 13(B) is a bottom view of the SMD package 61. The SMD package 61 has approximately a hollow rectangular parallelepiped shape. The SMD package 61 is formed by sequentially stacking a first layer substrate 62, a second layer substrate 63, a third layer substrate 64, a fourth layer substrate 65, and a fifth layer substrate 66, which have a rectangular shape. As examples of a material of the first layer substrate 62, the second layer substrate 63, the third layer substrate 64, the fourth layer substrate 65, and the fifth layer substrate 66, ceramic or a resin can be used. The first layer substrate 62, the second layer substrate 63, the third layer substrate 64, the fourth layer substrate 65, and the fifth layer substrate 66 may be stacked after being formed separately and may be formed integrally.

Outer circumferential surfaces (lateral surfaces) of the first layer substrate 62, the second layer substrate 63, the third layer substrate 64, the fourth layer substrate 65, and the fifth layer substrate 66 are approximately flush with each other in a stack state. An opening of the rectangular shape is provided in a center portion of each of the second layer substrate 63, the third layer substrate 64, the fourth layer substrate 65, and the fifth layer substrate 66. The opening of the third layer substrate 64 is larger than the opening of the second layer substrate 63. The opening of the fourth layer substrate 65 is larger than the opening of the third layer substrate 64. The opening of the fifth layer substrate 66 is larger than the opening of the fourth layer substrate 65. By this configuration, in a state in which the first layer substrate 62, the second layer substrate 63, the third layer substrate 64, the fourth layer substrate 65, and the fifth layer substrate 66 are stacked, parts of top surfaces of the first layer substrate 62, the second layer substrate 63, the third layer substrate 64, and the fourth layer substrate 65 are exposed from the opening of the fifth layer substrate 66.

Bonding pads and wiring lines are disposed on exposed top surfaces of the first layer substrate 62, the second layer substrate 63, the third layer substrate 64, and the fourth layer substrate 65. In an example illustrated in FIG. 13(A), a mounting unit 62a and a mounting unit 62c are disposed on the top surface of the first layer substrate 62. The mounting unit 62a is used to fix a light detector 3. The mounting unit 62c is used to dispose a thermistor 7. The mounting units 62a and 62c are electrically connected to different electrode pads 67 by wiring lines 62d. The wiring lines 62d are disposed to pass a portion between the first layer substrate 62 and the second layer substrate 63.

Two bonding pads 63a and wiring lines 63b connected to the bonding pads 63a are disposed on the top surface of the second layer substrate 63. The bonding pads 63a are electrically connected to the different electrode pads 67 by the wiring lines 63b. The wiring lines 63b are disposed to pass a portion between the second layer substrate 63 and the third layer substrate 64.

Four bonding pads 65a and wiring lines 65b connected to the bonding pads 65a are disposed on the top surface of the fourth layer substrate 65. The bonding pads 65a are electrically connected to the different electrode pads 67 by the wiring lines 65b. The wiring lines 65b are disposed to pass a portion between the fourth layer substrate 65 and the fifth layer substrate 66.

A through-hole 62e is provided in the first layer substrate 62. The through-hole 62e functions as a ventilation hole to release thermally expanded air, when the spectral sensor 1B is manufactured.

As illustrated in FIG. 13(B), the two electrode pads 67 are provided at each side of a bottom surface of the SMD package 61. The arrangement of the electrode pads 67 is not limited to a form illustrated in FIG. 13(B) and may be appropriately changed according to a function required for the spectral sensor 1B.

Figure 14:
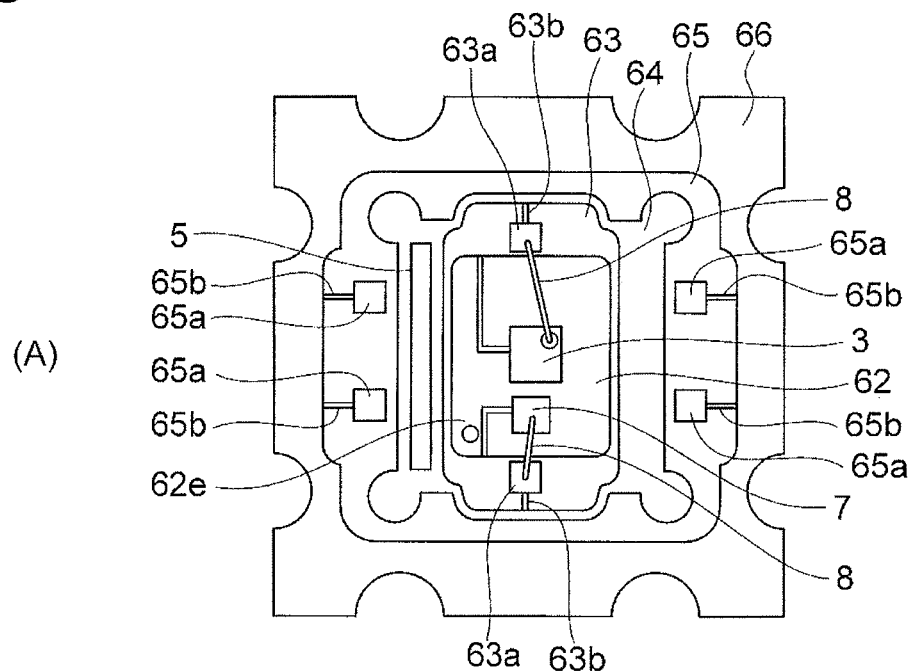
FIG. 14 is a plan view illustrating a process for manufacturing the light-detecting device according to the second embodiment, following FIG. 13.
Figure 14:
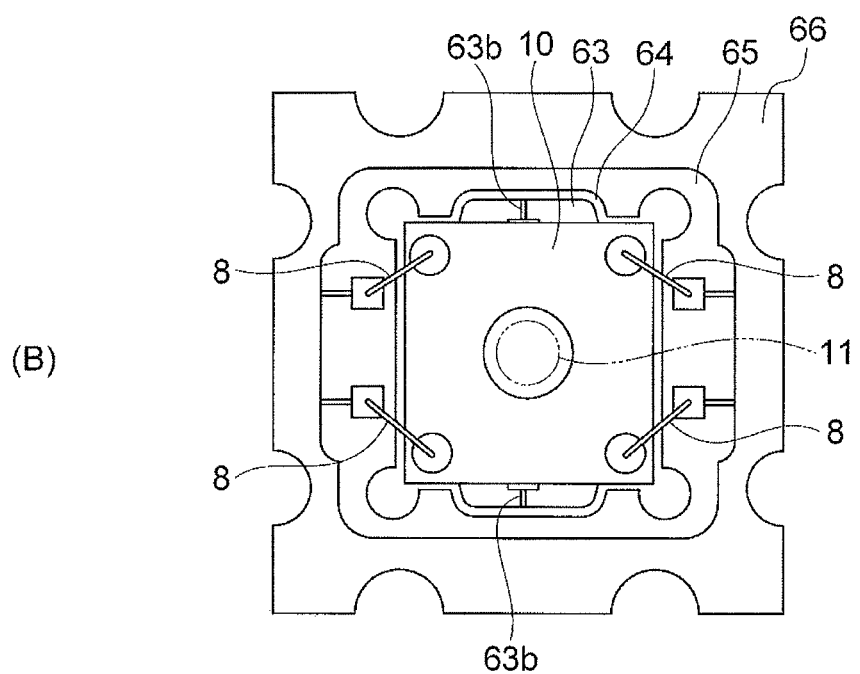

After the SMD package 61 is prepared, as illustrated in FIG. 14(A), the light detector 3 is mounted on the mounting unit 62a. In addition, the thermistor 7 is mounted on the mounting unit 62c. In addition, the light detector 3 and the bonding pad 63a (wire connection portion) are connected by wire bonding using the wire 8. In addition, the thermistor 7 and the bonding pad 63a are connected by the wire bonding using the wire 8. In addition, a die bond resin 5 is applied linearly to a portion along one side of the opening of the third layer substrate 64 on the top surface of the third layer substrate 64. Therefore, even in the spectral sensor 1B according to the second embodiment, the die bond resin 5 is disposed to have an opening.

Next, as illustrated in FIG. 14(B), a Fabry-Perot interference filter 10 is fixed on the top surface of the third layer substrate 64. As a result, the third layer substrate 64 functions as a support member to support the Fabry-Perot interference filter 10 in a surrounding region of a light transmission region 11. At this time, the die bond resin 5 forms an adhesive portion to adhere the third layer substrate 64 and the Fabry-Perot interference filter 10 to each other. The Fabry-Perot interference filter 10 is disposed such that terminals 12 and 13 thereof are positioned at an edge portion of the opening of the third layer substrate 64. The die bond resin 5 functioning as an adhesive agent used to fix the Fabry-Perot interference filter 10 on the top surface of the third layer substrate 64 is softer than an adhesive agent used to fix the light detector 3 on the top surface of the first layer substrate 62. In addition, when the first layer substrate 62, the second layer substrate 63, the third layer substrate 64, the fourth layer substrate 65, and the fifth layer substrate 66 formed separately are stacked to form the SMD package 61, the die bond resin 5 is softer than an adhesive agent to adhere the substrates adjacent to each other. As a result, fixation of the light detector 3 and the first layer substrate 62 and formation of the SMD package 61 are performed firmly and thermal strain from a peripheral member of the Fabry-Perot interference filter 10 can be suppressed from being transmitted to the Fabry-Perot interference filter 10 via the adhesive agent.

In addition, the terminals 12 and 13 of the Fabry-Perot interference filter 10 are connected to the bonding pads 65a by the wire bonding using the wire 8.

Figure 15:
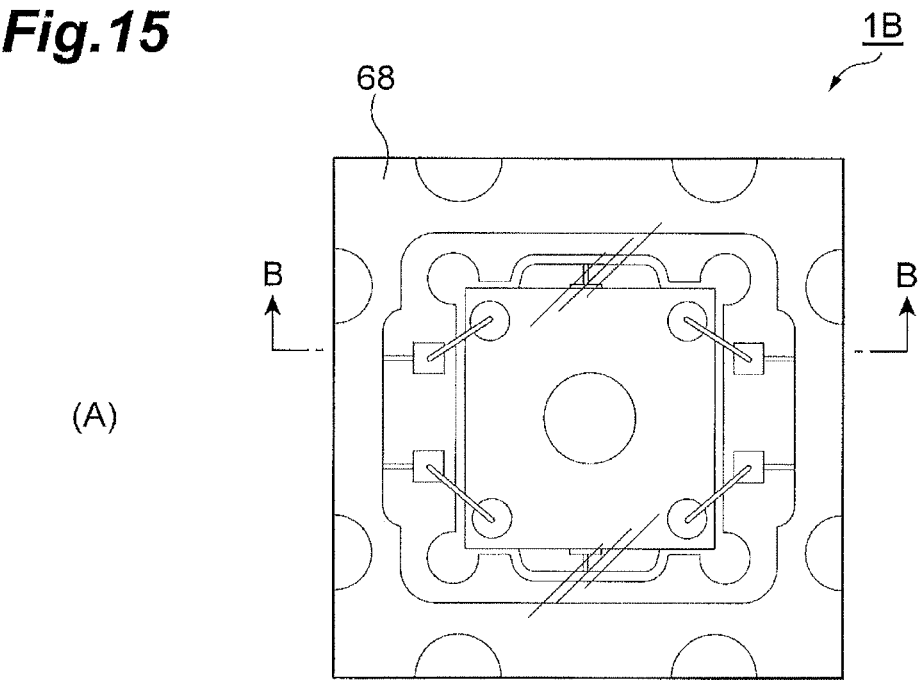
FIG. 15 is a plan view illustrating a process for manufacturing the light-detecting device according to the second embodiment, following FIG. 13.
Figure 15:
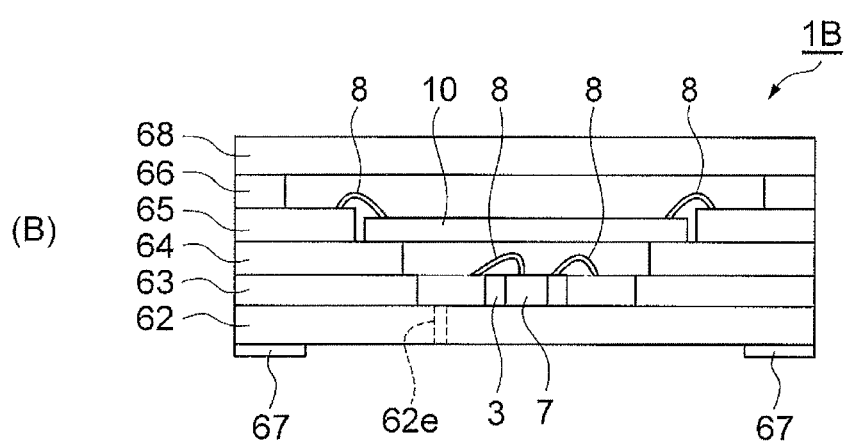

Finally, as illustrated in FIGS. 15(A) and 15(B), a transmission window 68 is fixed on the fifth layer substrate 66. FIG. 15(A) is a plan view of the spectral sensor 1B obtained by the manufacturing processes described above and FIG. 15(B) is a cross-sectional view taken along line B-B of FIG. 15(A). The transmission window 68 may be a transmission window using a material corresponding to an application wavelength range of the spectral sensor 1B. As the material, glass, silicon, and germanium are exemplified. In addition, the transmission window 68 may be a window to which a reflection prevention film is attached or a band-pass filter to restrict the application wavelength range.

Figure 16:
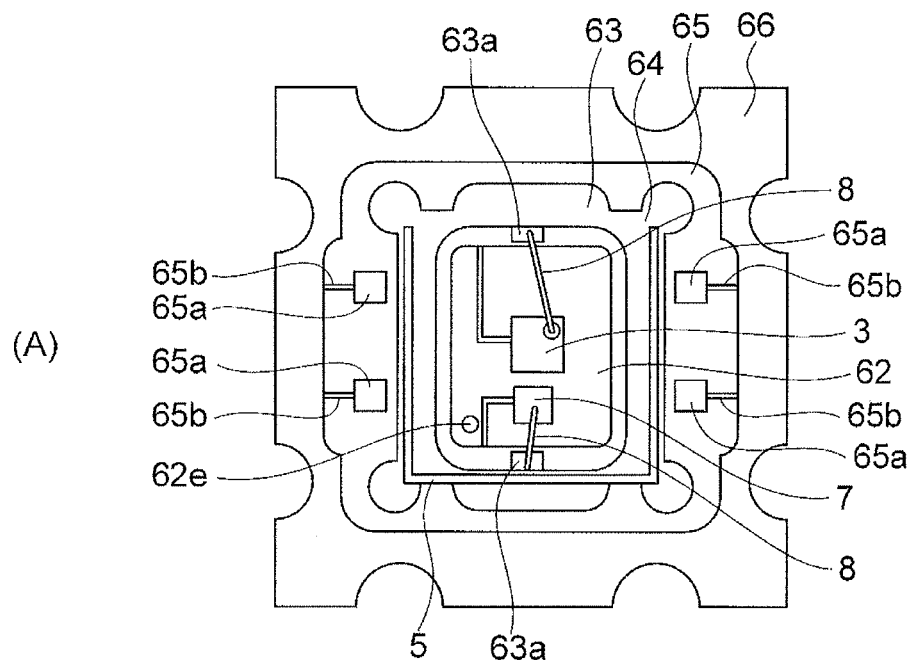
FIG. 16 is a plan view illustrating a process for manufacturing the light-detecting device according to the second embodiment, following FIG. 13, and a modification of the light-detecting device according to the second embodiment.
Figure 16:
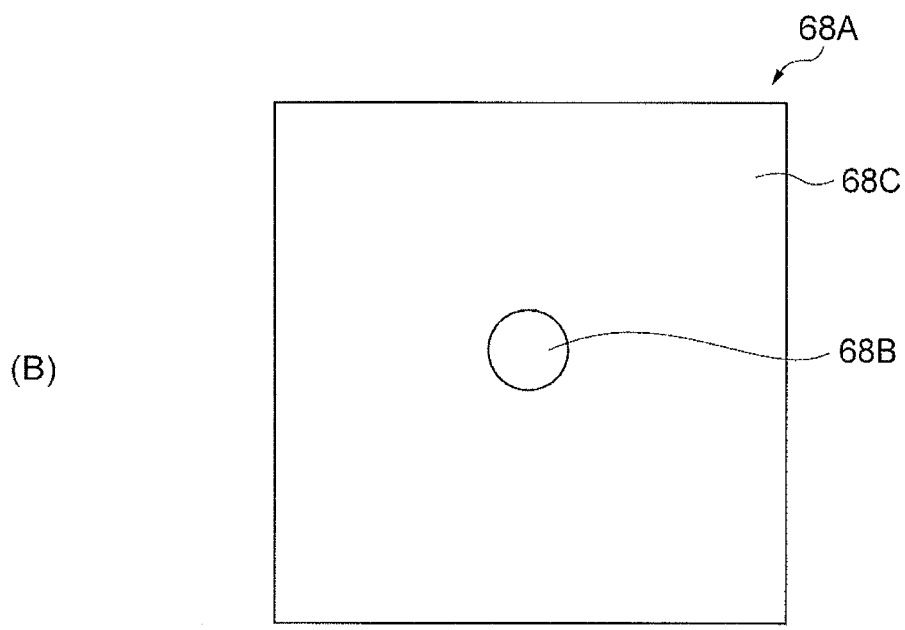

The arrangement of the applied die bond resin 5 is not limited to a form illustrated in FIG. 14(A) and various modifications may be taken. For example, as illustrated in FIG. 16(A), the die bond resin 5 may be applied. The die bond resin 5 is applied in a shape of U along three sides of a peripheral portion of the opening of the third layer substrate 64. In this case, a portion along the remaining one side of the peripheral portion of the opening of the third layer substrate 64 functions as an opening.

For the transmission window 68, a transmission window 68A provided with a film 68C may be used as illustrated in FIG. 16(B). The film 68C is provided in a portion other than a light transmission region 68B and does not transmit light. In this case, stray light can be reduced. As the film 68C, a film having a light shielding function or a film having a light absorption function can be used.

The preferred embodiments of the present invention have been described. However, the present invention is not limited to the embodiments. For example, in the spectral sensor 1A according to the first embodiment, the spacer 4 may be fixed on the light detector 3, not the wiring substrate 2. In this case, thermal strain from a peripheral member of the Fabry-Perot interference filter 10 can be suppressed from being transmitted to the Fabry-Perot interference filter via the light detector 3 and the die bond resin 5 from the wiring substrate 2.

In the embodiments, as illustrated in FIG. 2, the light transmission region 11 is the region narrower than the opening 50a. However, the present invention is not limited to the above form. When light with a width narrowed previously is introduced as incidence light, as illustrated in FIG. 2, the light transmission region 11 becomes narrower than the opening 50a. However, when light with a width larger than a width of the opening 50a is introduced as the incidence light, the opening 50a defines the light transmission region 11. The present invention can be applied to such a form.

INDUSTRIAL APPLICABILITY

According to a light-detecting device according to an aspect of the present invention, a temperature characteristic of a transmission wavelength of a Fabry-Perot interference filter can be suppressed from being deteriorated.

REFERENCE SIGNS LIST 1A, 1B: spectral sensor (light-detecting device), 2: wiring substrate, 3: light detector, 4, 4A to 4E: spacer (support member), 5: die bond resin, 10: Fabry-Perot interference filter, 11: light transmission region, 12, 13: terminal (bonding pad), 62: first layer substrate (wiring substrate), 64: third layer substrate (support member), A1: opening of spacer 4, A2: opening of die bond resin. 5.

The invention claimed is:

1. A light-detecting device comprising:
a Fabry-Perot interference filter which has a light transmission region;
a light detector which detects light having transmitted the light transmission region;
a support member which supports the Fabry-Perot interference filter in a surrounding region of the light transmission region; and
an adhesive portion which adheres the Fabry-Perot interference filter and the support member to each other, the adhesive portion and the support member being separate members,
wherein the adhesive portion has an opening via which an inner side of the surrounding region communicates with an outer side of the surrounding region, when viewed from a Eight transmission direction in the Eight transmission region, the opening being in a direction that is perpendicular to the light transmission direction.

2. The light-detecting device according to claim 1, wherein the adhesive portion is provided at one side of the Fabry-Perot interference filter and one side adjacent thereto, when viewed from the transmission direction.

3. The light-detecting device according to claim 1, further comprising:

a wiring substrate,
wherein the light detector and the support member are fixed on the wiring substrate.

4. The light-detecting device according to claim 1, wherein the support member is fixed on the light detector.

5. The light-detecting device according to claim 1, wherein the adhesive portion is provided at only one side of the Fabry-Perot interference filter, when viewed from the transmission direction.

6. The light-detecting device according to claim 1, wherein the support member has an opening communicating with the inner side of the surrounding region and the outer side of the surrounding region, when viewed from the transmission direction.

7. The light-detecting device according to claim 1, wherein the Fabry-Perot interference filter has a bonding pad, and
the support member is disposed at a position corresponding to the bonding pad, when viewed from the transmission direction.

8. The light-detecting device according to claim 1, wherein the support member is separated from the light transmission region, when viewed from the transmission direction.

9. The light-detecting device according to claim 1, wherein the Fabry-Perot interference filter has a bonding pad provided a surface on a light incident side of the Fabry-Perot interference filter.

10. The light-detecting device according to claim 9, further comprising:
a wire connection portion to which one end of a wire electrically connected to the light detector or the Fabry-Perot interference filter is connected and which inputs or outputs an electric signal with respect to the light detector or the Fabry-Perot interference filter,
wherein a top surface of the wire connection portion is disposed at a position lower than a position of a top surface of the Fabry-Perot interference filter.

11. The light-detecting device according to claim 9, wherein the top surface of the wire connection portion is disposed at a position lower than a position of a top surface of the support member.

12. The light-detecting device according to claim 9, wherein the wire connection portion includes a first wire connection portion electrically connected to the light detector and a second wire connection portion electrically connected to the Fabry-Perot interference filter, and
a first direction in which a distance between the first wire connection portion and the Fabry-Perot interference filter becomes shortest crosses a second direction in which a distance between the second wire connection portion and the Fabry-Perot interference filter becomes shortest.

13. The light-detecting device according to claim 1, wherein the light detector is disposed further inside than the support member, when viewed from the transmission direction.

14. A light-detecting device comprising:
Fabry-Perot interference filter which has a light transmission region;
a light detector which detects light having transmitted the light transmission region;
a support member which supports the Fabry-Perot interference filter in a surrounding region of the light transmission region; and an adhesive portion which adheres the Fabry-Perot interference filter and the support member to each other,
wherein the adhesive portion has an opening via which an inner side of the surrounding region communicates with an outer side of the surrounding region, when viewed from a light transmission direction in the light transmission region, the opening being in a direction that is perpendicular to the light transmission direction.

\* \* \* \* \*